(12) United States Patent
Koshi et al.

(10) Patent No.: US 6,205,254 B1
(45) Date of Patent: Mar. 20, 2001

(54) IMAGE CODING APPARATUS AND METHOD, AND IMAGE DECODING APPARATUS AND METHOD

(75) Inventors: Yutaka Koshi; Setsu Kunitake; Akihiro Andoh, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/064,008

(22) Filed: Apr. 22, 1998

(30) Foreign Application Priority Data

Apr. 22, 1997 (JP) .................................................. 9-104135

(51) Int. Cl.[7] .............................. G06K 9/36; G06K 9/46
(52) U.S. Cl. ......................... 382/239; 382/246; 382/247; 382/251
(58) Field of Search ................................ 341/51, 107, 65, 341/67, 59; 358/261.1, 261.2, 427, 428, 430; 348/404.1, 405.1, 409.1, 411.1, 394.1; 382/232, 238, 239, 244–246, 251; 375/240.12, 240.02, 240.03, 244–246, 253

(56) References Cited

U.S. PATENT DOCUMENTS

| | | | |
|---|---|---|---|
| 4,885,636 | * 12/1989 | Sullivan | 348/411.1 |
| 5,828,789 | 10/1998 | Yokose et al. | 382/239 |
| 5,963,673 | * 10/1999 | Kodama et al. | 382/239 |
| 5,966,183 | * 10/1999 | Kondo et al. | 348/409 |
| 6,008,847 | * 12/1999 | Bauchspies | 382/232 |
| 6,061,474 | * 5/2000 | Kajiwara et al. | 382/238 |

FOREIGN PATENT DOCUMENTS 9-224253  8/1997 (JP) .................................. H04N/7/32

OTHER PUBLICATIONS

LOCO–I: "A Low Complexity Lossless Image Compression Algorithm", Weinberger et al., ISO/IEC JTC 1/SC 29/WG 1 N 203 (Jul. 10, 1995).

"Revision of D25 Forming the Basis for Draft Rec. T.44(MRC–Colour)", ITU—Telecommunication Standardization Sector, Temporary Document 1018 (Feb. 4–13, 1997).

* cited by examiner

*Primary Examiner*—Amelia Au
*Assistant Examiner*—Timothy M. Johnson
(74) *Attorney, Agent, or Firm*—Oliff & Berridge, PLC

(57) ABSTRACT

An image coding apparatus and method efficiently compresses a variety of images by a lossless or near-lossless coding, and an image decoding apparatus and method decodes code data encoded by the image coding apparatus and method. A windowing unit determines peripheral pixel values, which include a coding object pixel value and values of pixels located near the coding object pixel. An approximation unit uses plural approximation methods so as to output decoded pixel candidates, each of which approximates the coding object pixel value based on the values of the nearby pixels by using one of the plural approximation methods. The plural approximation methods can include an interpolation method and a quantization method. A minimum error selector calculates an error between the coding object pixel value and each of the decoded pixel candidates, and outputs a rank of the approximation method that produced the minimum error. A rank/runlength calculator counts the runlength of first ranks and outputs a coding symbol. The coding symbol can be the rank or the runlength. An encoder encodes the coding symbol so as to output code data.

15 Claims, 27 Drawing Sheets

| $R_0$ | $R_1$ | $R_2$ | $R_3$ | $R_4$ |
|---|---|---|---|---|
| $R_5$ | $R_6$ | $R_7$ | $R_8$ | $R_9$ |
| $R_{10}$ | $R_{11}$ | X | | |

CODING OBJECT PIXEL : X   : $R_i \{ i = 0, 11 \}$
PIXEL VALUES AROUND X,
FOR WHICH SOURCE DECODING HAVE BEEN PERFORMED

FIG. 6

DECODED PIXEL VALUE : H
BY INTERPOLATOR H $$H = \frac{R_7 + R_{11}}{2}$$

DECODED PIXEL VALUE : L
BY INTERPOLATOR L
(AN AVERAGE OF PERIPHERAL PIXELS $R_i$)

$$L = AVE(R_i) = \frac{1}{12} \sum_{i=0}^{11} R_i$$

DECODED PIXEL VALUE : T
BY QUANTIZER T
(AN AVERAGE OF PERIPHERAL PIXELS SATISFYING $R_i \geq L$)

$T = AVE(R_i \geq L)$

DECODED PIXEL VALUE : B
BY QUANTIZER B
(AN AVERAGE OF PERIPHERAL PIXELS SATISFYING $R_i < L$)

$B = AVE(R_i < L)$

DECODED PIXEL VALUE : E
BY QUANTIZER E $E = X$

FIG. 7

DECODED PIXEL VALUES : G
BY INTERPOLATOR G
(EXTRAPOLATION VALUE FROM
AN AVERAGE GRADIENT IN
HORIZONTAL / VERTICAL DIRECTION
OF PERIPHERAL PIXELS)

$$G = AVE(R_{11} + AVE(R_1-R_0, R_2-R_1, R_3-R_2, R_4-R_3, R_6-R_5, R_7-R_6, R_8-R_7, R_9-R_8, R_{11}-R_{10}), R_7 + AVE(R_5-R_0, R_6-R_1, R_7-R_2, R_8-R_3, R_9-R_4, R_{10}-R_5, R_{11}-R_6))$$

DECODED PIXEL VALUES : L
BY INTERPOLATOR L
(AVERAGE OF PERIPHERAL PIXELS $R_i$ : INTERPOLATION VALUE)

$$L = AVE(R_i) = \frac{1}{12}\sum_{i=0}^{11} R_i$$

DECODED PIXEL VALUES : T
BY QUANTIZER T
(AN AVERAGE OF PERIPHERAL PIXELS SATISFYING $R_i \geq L$)

$$T = AVE(R_i \geq L)$$

DECODED PIXELVALUES : B
BY QUANTIZER B
(AVERAGE OF PERIPHERAL PIXELS SATISFYING $R_i < L$)

$$B = AVE(R_i < L)$$

DECODED PIXEL VALUES : E
BY QUANTIZER E $$E = X$$

FIG. 9

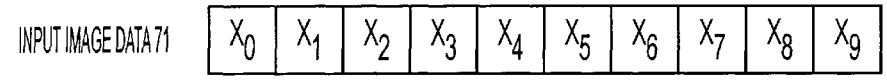
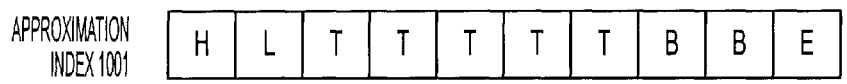
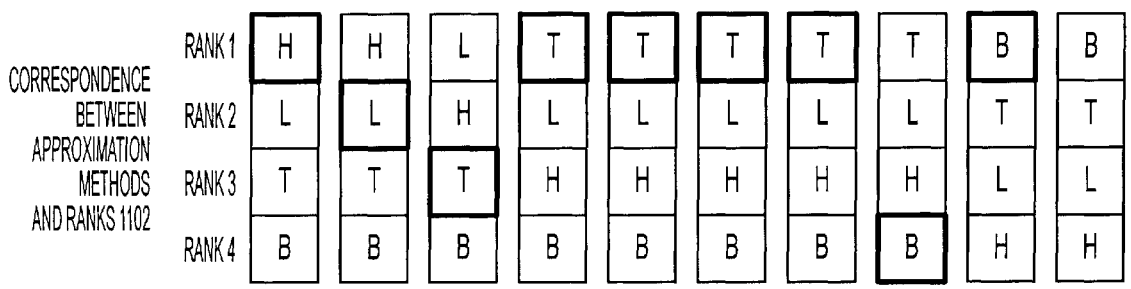
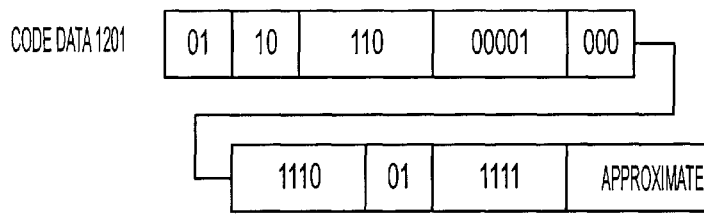
FIG. 15

| | | |
|---|---|---|
| RANK 1 RL1 | 01 | |
| RANK 1 RL2 | 001 | |
| RANK 1 RL3 | 0001 | |
| RANK 1 RL4 - 11 | 00001 | RL VALUE - 4 (3 BIT) |
| RANK 1 RL12 OR MORE | 00000 | RL VALUE - 12 (7 BIT) |
| RANK 2 | 10 | |
| RANK 3 | 110 | |
| RANK 4 | 1110 | |
| E | 1111 | APPROXIMATE VALUE (9 BIT) |

FIG. 16

INPUT IMAGE DATA 71

| 4 | 3 | 2 | 1 |
|---|---|---|---|
| 5 | 4 | 3 | 2 |
| 6 | 5 | 4 | 3 |
| 7 | 6 | 5 | 4 |

|   | b |
|---|---|
| a | x |

APPROXIMATE VALUE BY INTERPOLATOR A
A = (2 + b) / 2

APPROXIMATION INDEX 1001

| - | - | - | - |
|---|---|---|---|
| - | A | A | A |
| - | A | A | A |
| - | A | A | A |

APPROXIMATE VALUE BY QUANTIZER E
E = X

CODING SYMBOL 1101

| - | - | - | - |
|---|---|---|---|
| - |   | RL3 |   |
| - |   | RL3 |   |
| - |   | RL3 |   |

FIG. 27

INPUT IMAGE DATA 71

| 1 | 2 | 6 | 1 |
|---|---|---|---|
| 7 | 6 | 7 | 6 |
| 6 | 1 | 2 | 7 |
| 7 | 2 | 7 | 6 |

| c | b |
|---|---|
| a | x |

APPROXIMATE VALUE BY QUANTIZER A
A = MIN (a, b, c)

APPROXIMATION INDEX 1001

| - | - | - | - |
|---|---|---|---|
| - | B | B | B |
| - | A | A | B |
| - | A | B | B |

APPROXIMATE VALUE BY QUANTIZER B
A = MAX (a, b, c)

APPROXIMATE VALUE BY QUANTIZER E
E = X

CODING SYMBOL 1101

| - | - | - | - |
|---|---|---|---|
| - | 2 | RL2 |  |
| - | 2 | RL1 | 2 |
| - | 2 | RL2 |  |

FIG. 28

IMAGE CODING APPARATUS AND METHOD, AND IMAGE DECODING APPARATUS AND METHOD

BACKGROUND OF THE INVENTION

1. Field of the Invention

This invention relates to image compression. In particular, this invention relates to a coding technology appropriate for efficient lossless or near-lossless compression of both artificial (computer generated graphics) image data generated by a computer, e. g. PDL (Page Description Language) image data, and scan-in image data.

2. Description of the Related Art

In PDL images, identical pixel values appear consecutively at an extremely high rate. In other words, PDL images include many "0" (zeros) as the difference between two consecutive pixel values (See FIG. 24). Meanwhile, since identical pixel values rarely appear consecutively in a scan-in image, the compression ratio thereof is low (See FIG. 25). Because of the differences between the features of PDL and scan-in images, it is difficult to improve the coding rate of both images in a frame work.

In order to improve the coding rate of both scan-in images and PDL images, lossy coding, such as, e.g., coding according to an international standard JPEG (Joint Photographic Experts Group), can be used in combination with lossless coding, such as Huffman coding. However, the switching between lossless coding and lossy coding causes trouble, because of the difference in scanning order or the difference in code data streams. For example, while Huffman coding uses raster-scan, JPEG uses block-scan. Two examples of the lossless/lossy adaptive coding are explained below.

(1) Multi-plain Method

A candidate for an international standard, MRC (Mixed Raster Content), represents an image as three plains, which are a plain for lossless coding, a plain for lossy coding and a tag plain for switching between the former two plains. This method requires synchronization of the lossless plain and the lossy plain, when decoded images are sent to an image output device, such as a printer. In other words, image data of all plains should be prepared at a particular moment. Accordingly, an image buffer memory or plural decoders for accommodating the synchronization should be provided.

(2) Block Coding

A common scanning order is required to switch between lossless coding and lossy coding. For example, the scanning order of the lossless coding is changed to block scan. Instead, code data should be multiplexed. For example, a lossless coding stream and a lossy coding stream are multiplexed in a unit of a block. Accordingly, a lossless coding circuit or a multiplexing circuit becomes complicated.

LOCO-I (ISO/IEC JTX 1/SC 29/WG1 N203) is an example that performs lossy coding for scan-in images by using prediction coding. LOCO-I realizes near-lossless coding by quantizing prediction errors.

FIG. 29 is used to explain LOCO-I. As shown in this figure, windowing unit 1 receives input image data 7 and decoded pixel data 13. The input image data 7 is set as a coding object pixel. Pixel value predicator 2000 receives peripheral pixel values 8 output from the windowing unit 1 and supplies prediction value 9000 to prediction error calculator 3000. The prediction error calculator 3000 calculates prediction error 10000, which is an error between the coding object pixel and the prediction value 9000. Error quantizer 4000 quantizes the prediction error 10000. Then, entropy coding unit 5 encodes the quantized prediction error and outputs output code data 12. Local decoder 6000 receives the quantized prediction error 10000 and peripheral pixel values 8, performs local decoding and outputs decoded pixel data 13 to the windowing unit 1.

This method is based on pixel value prediction. Resolution adaptation or sub-sampling is not considered. This method determines a statistic of prediction errors by using a small prediction error or high auto-correlation of an image in a low frequency image area. Sub-sampling is efficient, since all information regarding a pixel is discarded and a source is extended. It is particularly desired to improve a compression ratio by using sub-sampling in a low frequency image area, such as a gradation area, in a scan-in image.

In addition, since this method is based on pixel value prediction, the coding rate is decreased in a fine image structure area where auto-correlation in the image is low and pixel value prediction is difficult. Since the fine image structure area includes an AC-coefficient and requires a small tone level for an effective tone level reproduction, it is desired that a pixel value is directly quantized without pixel value prediction.

Objects of this invention include:

(1) performing lossless or near-lossless coding for both an artificial image, such as a PDL image, and a scan-in image in a framework, and (2) improving a coding rate of near-lossless coding for scan-in images.

SUMMARY OF THE INVENTION

The present invention has been made in view of the above circumstances. An objective of the present invention is to provide an image coding apparatus that receives a value of a first pixel and a value of a second pixel located near the first pixel, and calculates approximate values of the first pixel using plural approximation methods on the basis of the value of the second pixel. The value of the second pixel has been approximated in a preceding process. An error between the value of the first pixel and each of the approximate values is calculated. Then, one of the approximation methods whose error is a minimum is selected. The image coding apparatus assigns a rank to the selected approximation method, and encodes the rank and outputs a code data for the first pixel.

According to the image coding apparatus and method of the present invention, since an approximation method depending on essential factors of an image is selected, the volume of the image data can be compressed without lowering the quality of the image.

Furthermore, an objective of the present invention is to provide an image decoding apparatus and method that decodes the code data obtained by the process of the image coding apparatus of the present invention.

The image decoding apparatus receives code data encoded by the image coding apparatus described above and decodes the code data so as to obtain a rank of an approximation method. A plurality of approximation methods are provided and respectively are corresponded with ranks. An approximation method corresponding to the rank obtained by encoding the code data is used to calculate an approximate value of a first pixel on the basis of a value of a second pixel. The second pixel is located near the first pixel and is decoded in a preceding process. The calculated approximate value is output as image data.

According to the image decoding apparatus and method described above, since an approximation method depending on essential factors of an image is selected, the volume of the image data can be compressed and expanded without lowering the quality of the image.

BRIEF DESCRIPTION OF THE DRAWINGS

FIG. 6 is an example illustrating pixel positions in an window designated by the windowing circuit 101 in FIG. 4.

FIG. 7 is a diagram illustrating an example of approximation methods performed by approximation circuits 201–205 in FIG. 4.

FIG. 9 is a diagram illustrating another example of approximation methods performed by approximation circuits 201–205 in FIG. 4.

FIG. 15 shows an example of a coding process performed by the image coding apparatus in FIG. 4.

FIG. 16 shows an example of code assignment used in Huffman coding circuit 501 in FIG. 4.

FIG. 27 is a diagram illustrating a coding process for a gradation area in an embodiment of the present invention.

FIG. 28 is a diagram illustrating a coding process for a fine image structure area in an embodiment of the present invention.

DETAILED DESCRIPTION OF THE PREFERRED EMBODIMENT

An outline of the embodiment is as follows.

(1) Ranks of quantizers (and dequantizers) and ranks of sub-samplers (and interpolators) are coded.

(2) In a low frequency image area, compression performance from source extension that is obtained by sub-sampling is achieved by performing runlength coding for the ranks of interpolators.

(3) In a fine image structure area where pixel value prediction is difficult, drop of compression ratio is avoided by coding ranks of quantizers.

Figure 1:
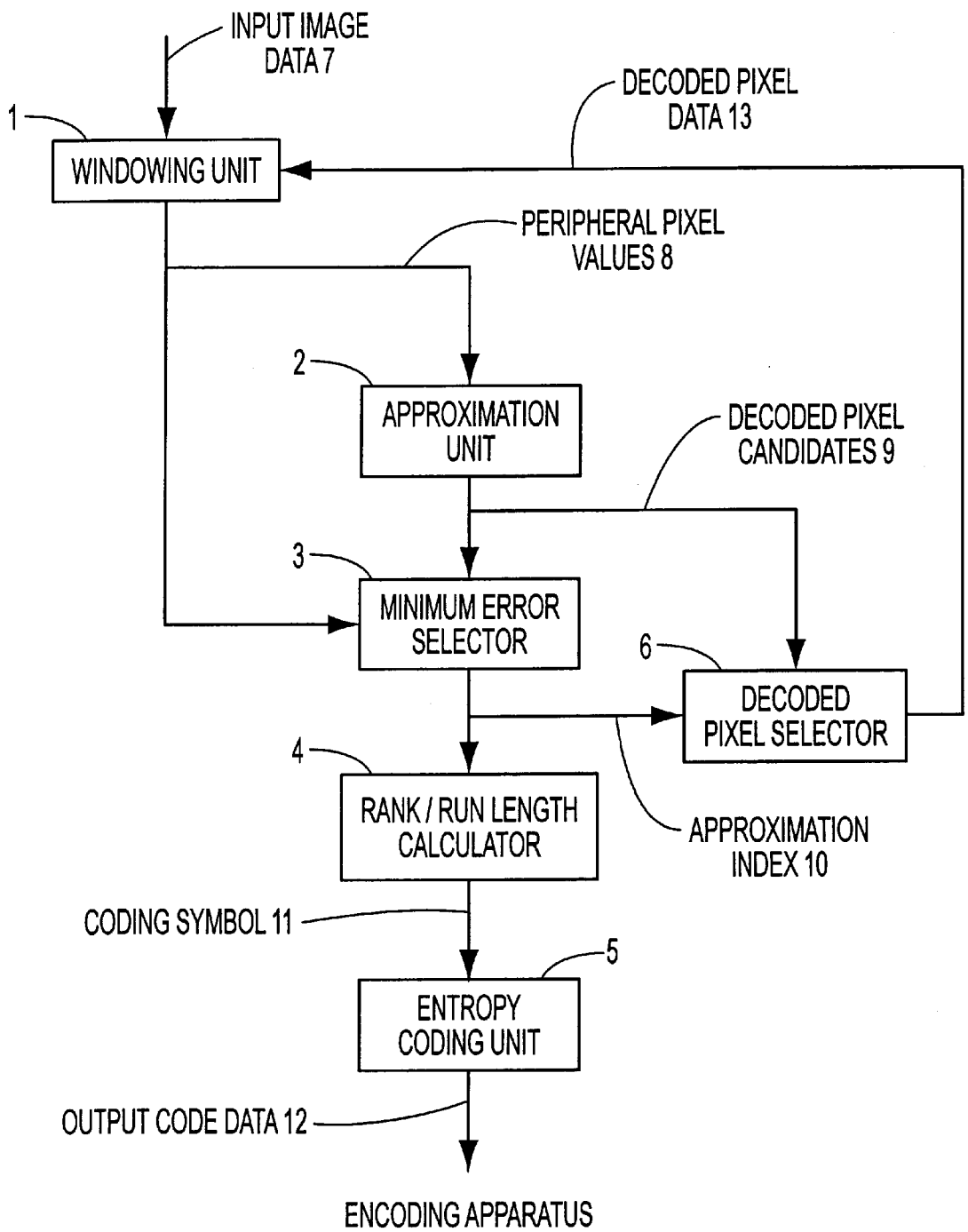
FIG. 1 is a block diagram illustrating a configuration of an image coding apparatus of the present invention.

FIG. 1 is a block diagram illustrating an embodiment of an image coding apparatus of the present invention. In FIG. 1, the image coding apparatus includes windowing unit 1, approximation unit 2, minimum error selector 3, rank/runlength calculator 4, entropy coding unit 5 and decoded pixel selector 6.

The windowing unit 1 receives a value of a coding object pixel from input image data 7, values being inputted one by one in order of raster-scan. The windowing unit 1 outputs peripheral pixel values 8, which include the coding object pixel and values of pixels around the coding object pixel for which source coding and decoding have been performed. The windowing unit 1 also receives and stores decoded pixel data 13, which is a pixel value for which source coding and decoding have been performed.

The approximation unit 2 calculates approximate values of the coding object pixel by using plural approximation methods based on the peripheral pixel values 8, and outputs the approximated values as decoded pixel candidates 9. The approximation methods include quantization methods and sub-sampling (or interpolation) methods. In the embodiment of the present invention, the quantization method consists of quantization and dequantization. The sub-sampling (or interpolation) method consists of subsampling and interpolation. The approximation methods are designed by using the pixel values for which source coding and decoding have been performed. For example, it is possible to use a quantization method that performs quantization by using the maximum value or median value in the decoded pixel values. It is also possible to use an interpolation method that uses an average of the decoded pixel values as an interpolation value.

The minimum error selector 3 calculates errors between the value of a coding object pixel included in the peripheral pixel values 8 and the decoded pixel candidates 9, and outputs approximation index 10, which is the index of the approximation method that obtains the smallest error. The rank/runlength calculator 4 assigns a rank to the approximation index, counts runlength of ranks, and outputs coding symbol 11 For example, the correspondence between the approximation methods and ranks is updated whenever a pixel is coded. In the update, the most recently selected approximation method can be set as the first rank. Instead, the approximation method that is most frequently selected in some preceding results of coding for pixels can be ranked first. Thus, the rank is assigned according to probabilities.

The entropy coding unit 5 receives the coding symbol 11, which is a runlength of first ranks, and performs entropy coding for it. For example, a coding method that reduces statistic redundancy of the coding symbol, such as Huffman coding or arithmetic coding, can be used.

The decoded pixel selector 6 selects a decoded pixel value calculated by the selected approximation method. In other words, the decoded pixel selector 6 selects an approximate value (decoded pixel data 13) from the decoded pixel candidates 9 based on approximation index 10.

Figure 2:
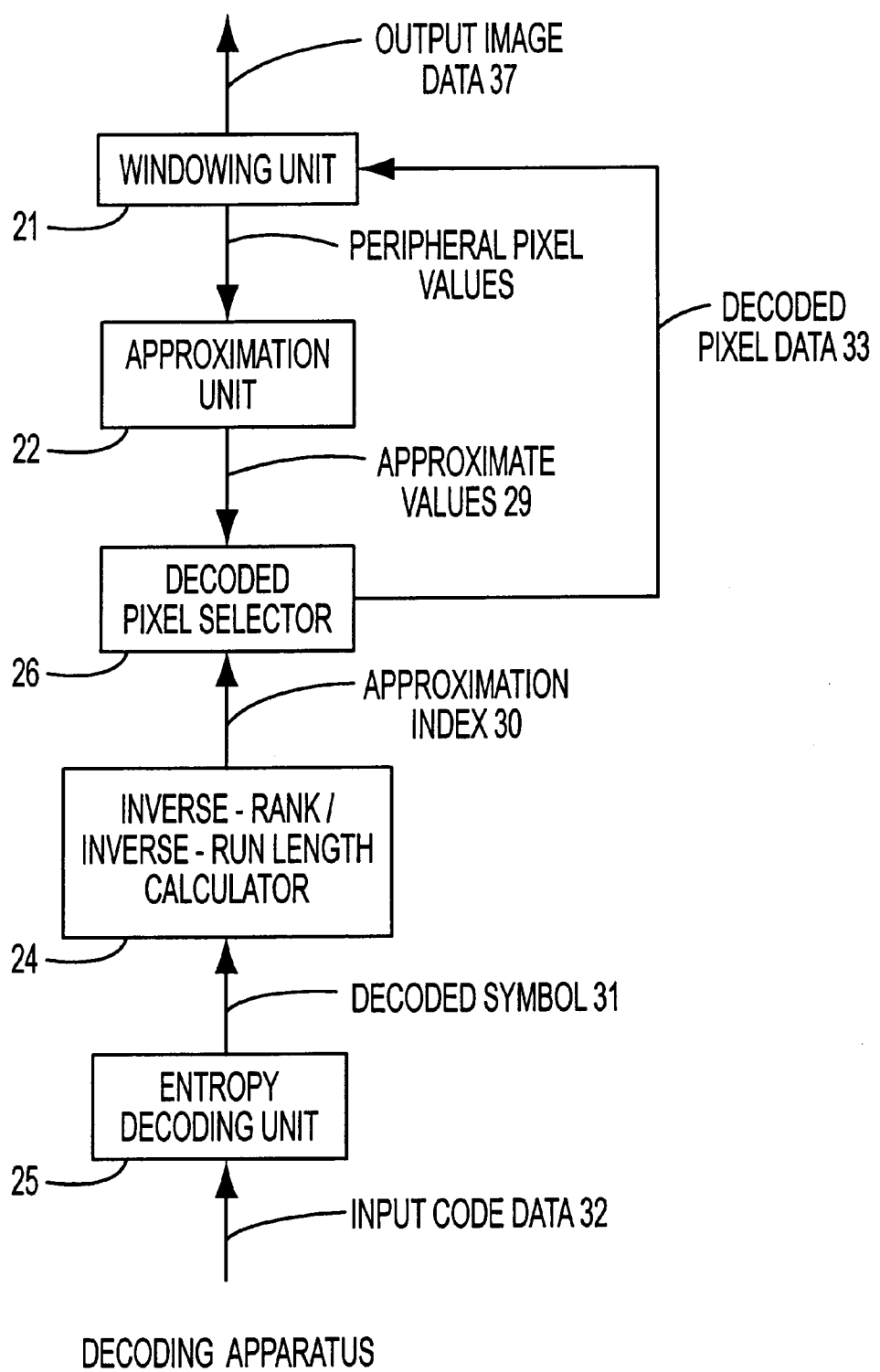
FIG. 2 is a block diagram illustrating a configuration of an image decoding apparatus of the present invention.

FIG. 2 shows a block diagram of an image decoding apparatus that decodes the code data output by the image coding apparatus shown in FIG. 1. Blocks shown in FIG. 2 have reference numbers that are obtained by adding 20 to the reference numbers of corresponding blocks in FIG. 1. The reference numbers 31, 32, 33 and 37 indicate a decoded symbol, input code data, decoded pixel data and output image data, respectively.

Figure 3:
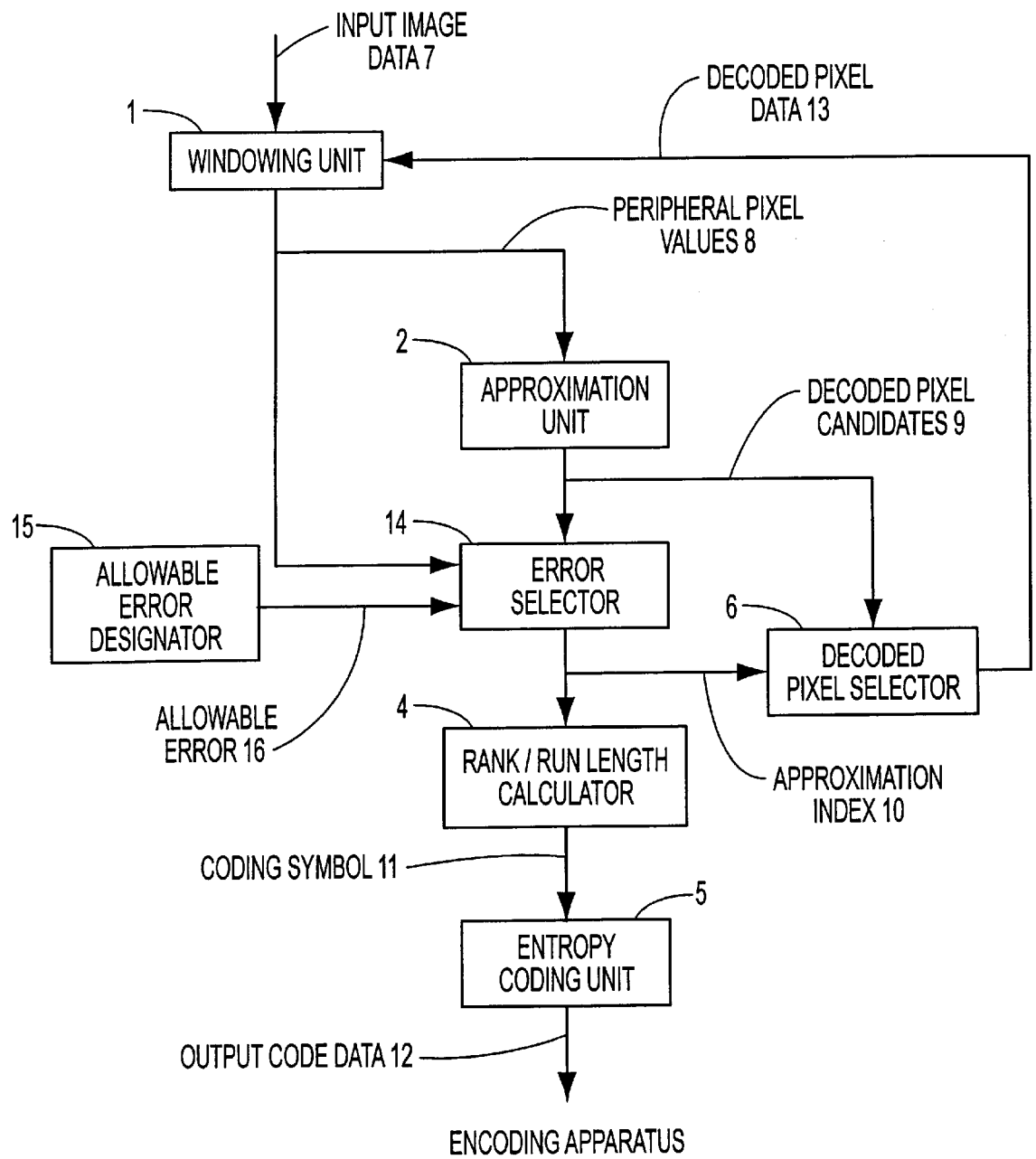
FIG. 3 is a block diagram illustrating another configuration of an image coding apparatus of the present invention.

FIG. 3 is a block diagram that shows another configuration of the image coding apparatus of the present invention. In this figure, allowable error designator 15 is added to the configuration shown in FIG. 1. Additionally, the minimum error selector 3 is replaced by error selector 14. When the minimum error is larger than the allowable error designated by the allowable error designator 15, the error selector 14 outputs an error of the predetermined approximation method, instead of an index of an approximation method, to the rank/runlength calculator 4. In this case, the coding symbol 11 is the error itself.

Figure 4:
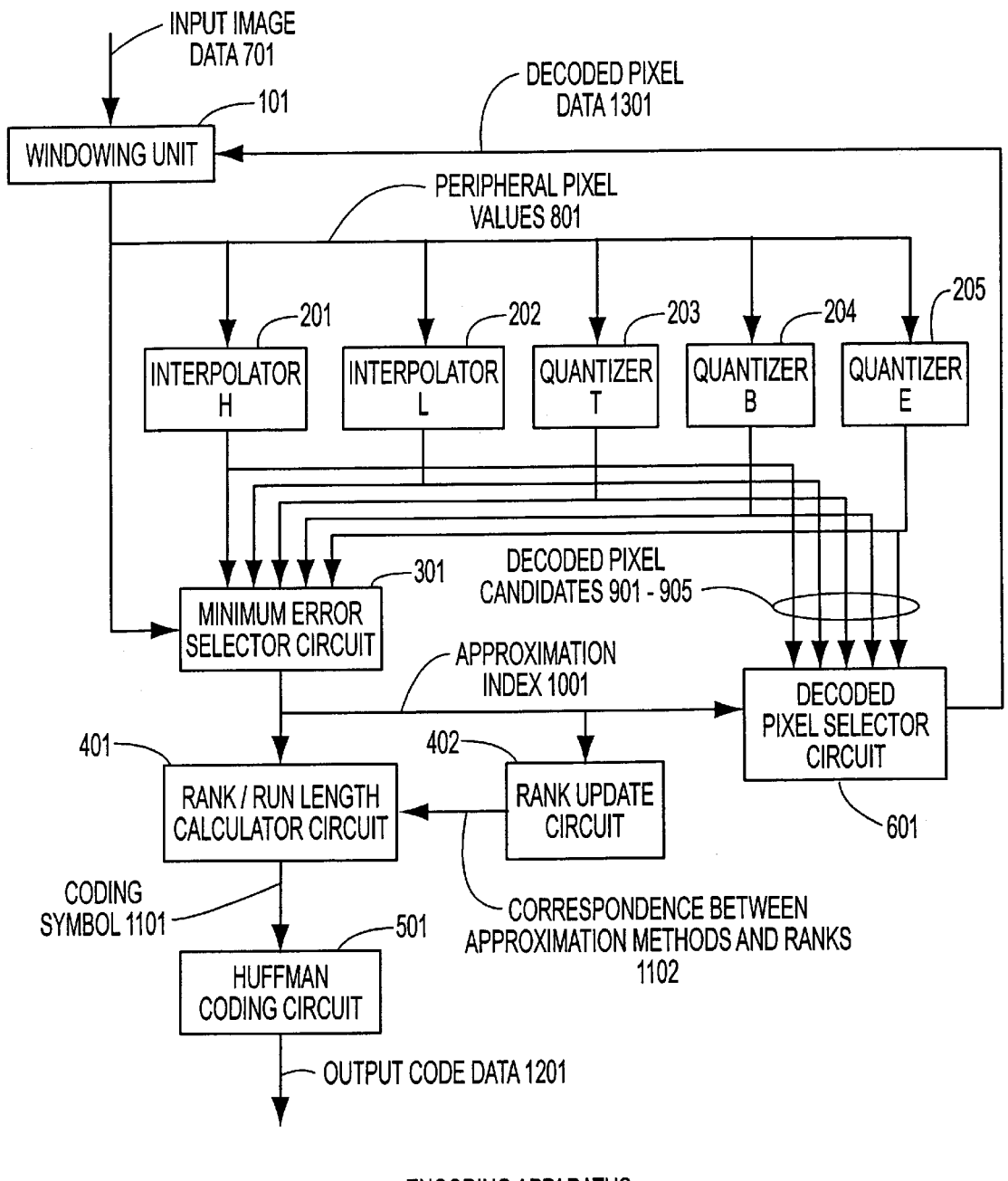
FIG. 4 is a block diagram illustrating a configuration of an image coding apparatus in an embodiment of the present invention.

FIG. 4 is a block diagram illustrating a detailed configuration of an embodiment of the image coding apparatus. In this figure, the image coding apparatus includes windowing circuit 101, interpolator H 201, interpolator L 202, quantizer T 203, quantizer B 204, quantizer E 205, minimum error selector circuit 301, rank/runlength calculator circuit 401, Huffman coding circuit 501, decoded pixel selector 601 and rank update circuit 402. Each of the interpolator H 201 and interpolator L 202 includes a sub-sampler and an interpolator. Each of the quantizer T 203, quantizer B 204, quantizer E 205 includes a quantizer and a dequantizer. Each circuit is explained below.

The windowing circuit 101 receives and stores input image data 701, which includes pixels input one by one in order of raster scan. The image data 701 is set as a coding object pixel X. The windowing circuit 101 outputs peripheral pixel values 801, which is a group of pixel values including pixel values R0–R11 and the coding object pixel X as shown in FIG. 6. The pixel values R0–R11 are values of pixels which are placed around the coding object pixel X as shown in FIG. 6 and for which source coding and decoding are performed. After the coding object pixel X is coded, the windowing circuit 101 receives decoded pixel data 1301 and replaces the coding object pixel X inputted as input image data 701 with it.

Interpolator H 201, interpolator L 202, quantizer T 203, quantizer B 204 and quantizer E 205 respectively calculate approximate values of the coding object pixel X based on the peripheral pixel values 801 by using the approximation methods shown in FIG. 7, and output the approximate values as decoded pixel candidates 901–905.

The minimum error selector circuit 301 calculates an error between the coding object pixel X in the peripheral pixel values 801 and each of the decoded pixel candidates 901–905. Then, the minimum error selector circuit 301 selects an approximation method with a minimum error, and outputs a signal indicating the selected approximation method as approximation index 1001. When the minimum error is larger than a predetermined allowable error, the minimum error selector circuit 301 outputs the error between the coding object pixel X and the approximate value calculated by the quantizer E 205 as the approximation index 1001.

The rank/runlength calculator circuit 401 assigns a rank to the approximation index 1001 according to the correspondence 1102 between approximation methods and ranks, and outputs the rank as a coding symbol 1101. When first ranks appear consecutively, the runlength of the first rank is output. When the minimum error selector 301 selected the quantizer E 205, the rank/runlength calculator circuit 401 receives the error of the quantizer E 205 as the approximation index 1001 and outputs the error as the coding symbol 1101.

The Huffman coding circuit 501 performs Huffman coding for the coding symbol 1101 by using a Huffman code table as shown in FIG. 16, and outputs output code data 1201. As shown in FIG. 16, if the quantizer E 205 is selected, the index E and the error are coded.

The decoded pixel selector circuit 601 selects a pixel value corresponding to the approximation index 1001 from the decoded pixel candidates 901 through 905, and outputs it as decoded pixel data 1301.

The rank update circuit 402 outputs correspondence 1102 between approximation methods and ranks. When a coding object pixel X has been coded, the correspondence is updated according to the approximation index 1001.

FIGS. 5, 8, and 10 through 14 are flowcharts that show processes performed by the circuits explained above. FIGS. 15 and 16 show examples of outputs from these circuits so as to make a series of the processes of these circuits clear.

Figure 5:
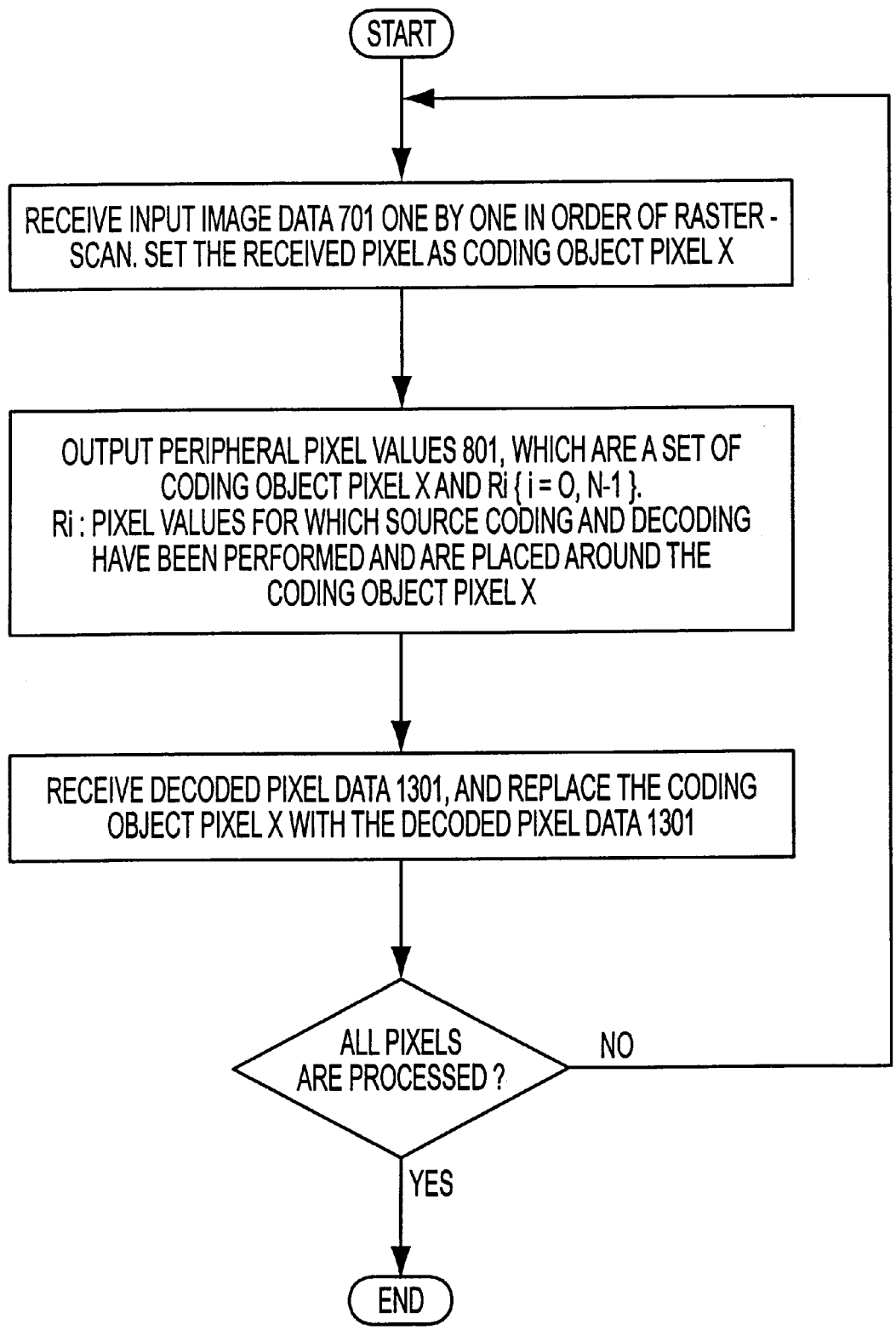
FIG. 5 is a flowchart illustrating a process performed by windowing circuit 101 shown in FIG. 4.

FIG. 5 shows a process performed by the windowing circuit 101. This process designates a window of peripheral pixel values as shown in FIG. 6.

Figure 8:
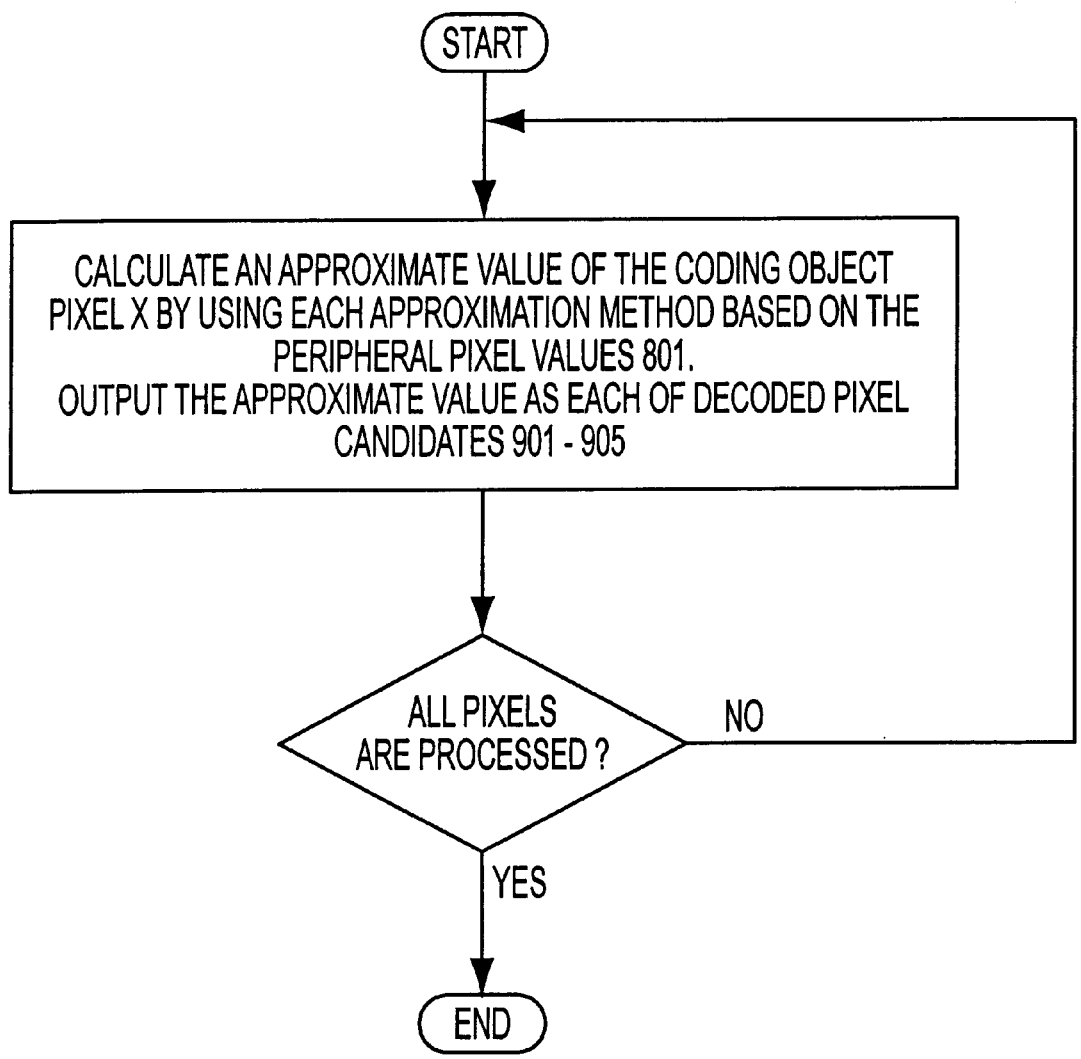
FIG. 8 is a flowchart illustrating a process performed by each of the approximation circuits 201–205 in FIG. 4.

FIG. 8 shows a process performed by each of the approximation circuits 201 through 205. Specifically, the approximation circuits calculate approximate values of the coding object pixel X by using the interpolators H and L, and quantizers T, B and E. Instead, it is possible to use interpolators G and L, and quantizers T, B and E as shown in FIG. 9.

Figure 10:
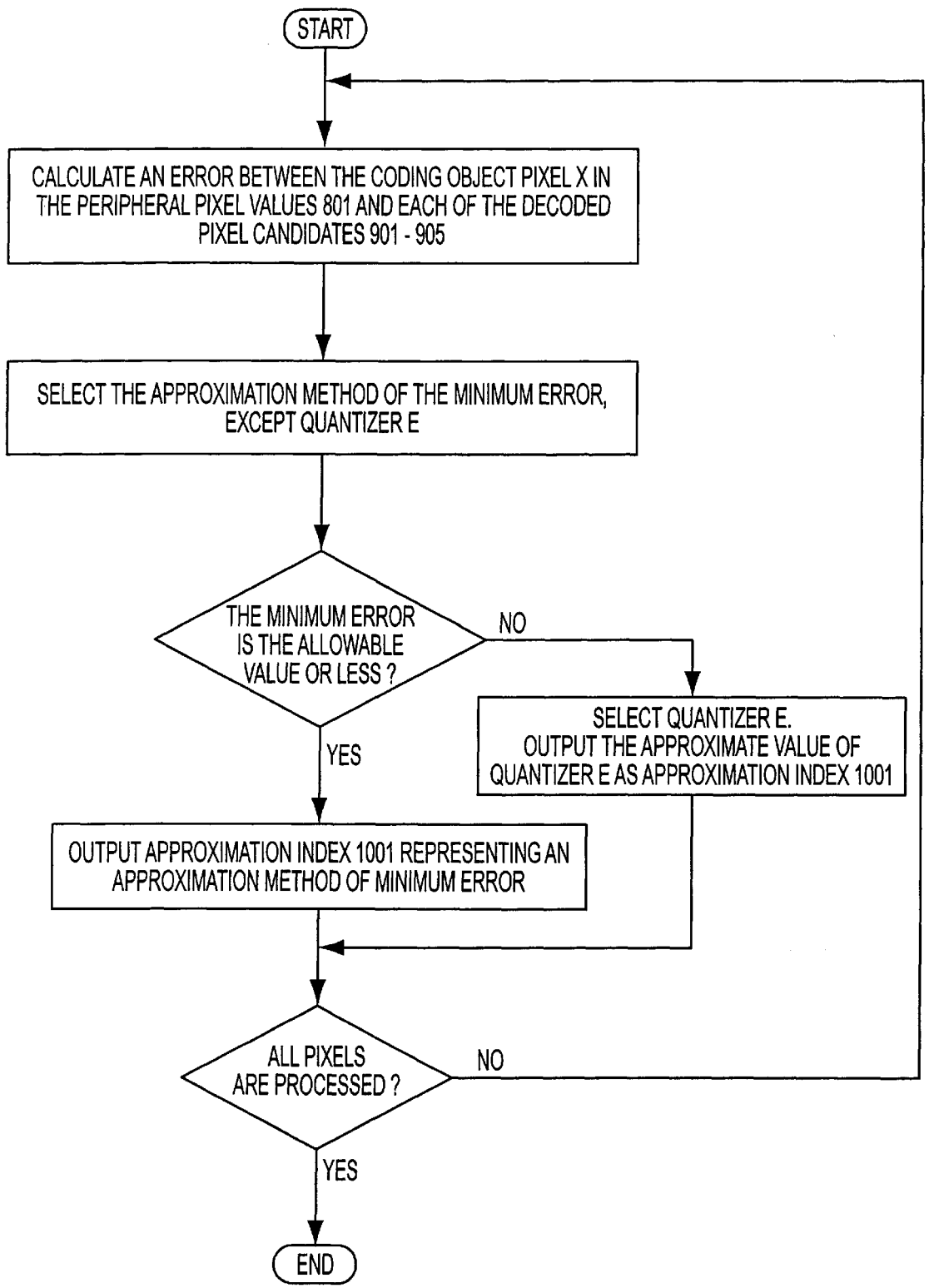
FIG. 10 is a flowchart illustrating a process performed by minimum error selector circuit 301 in FIG. 4.
Figure 11:
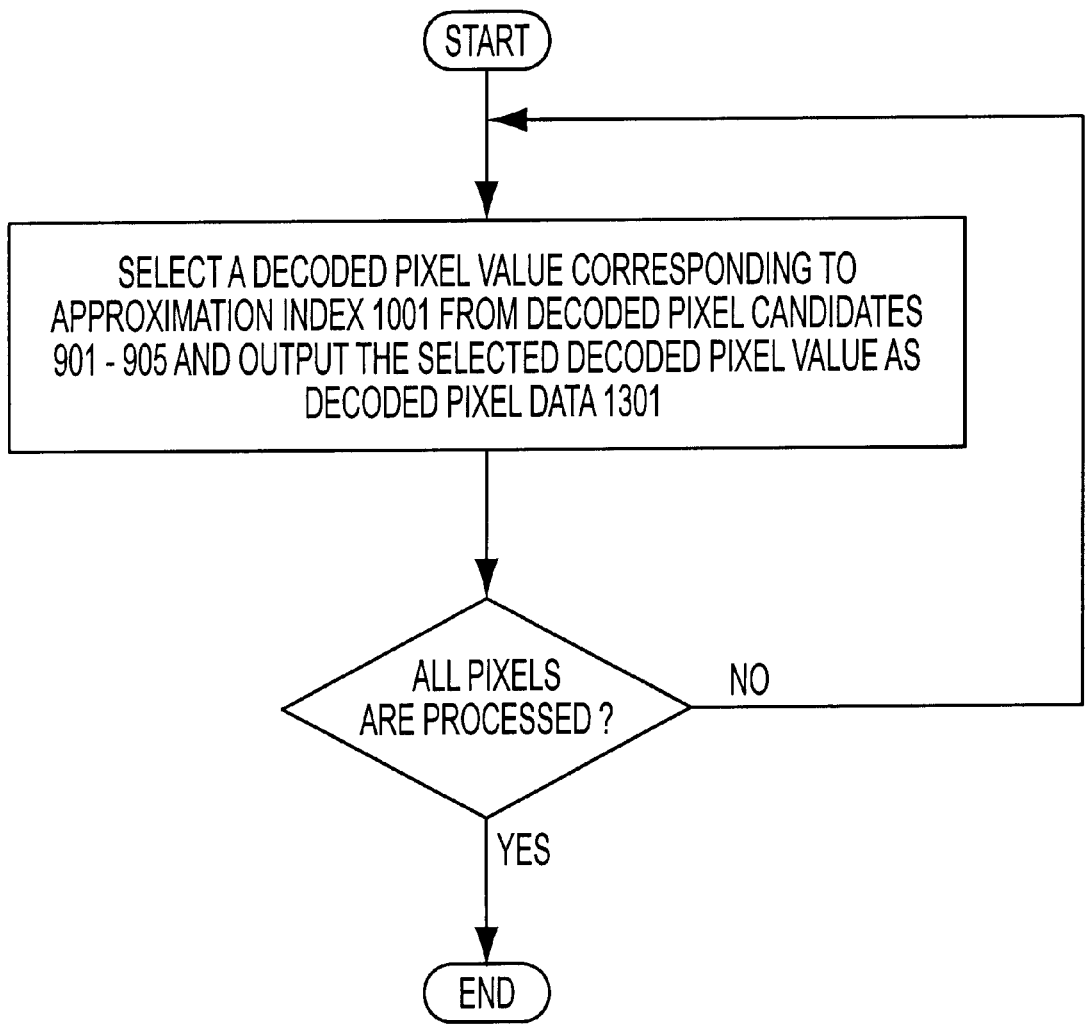
FIG. 11 is a flowchart illustrating a process performed by decoded pixel selector circuit 601 in FIG. 4.

FIG. 10 shows a process performed by the minimum error selector circuit 301. FIG. 11 shows a process of the decoded pixel selector circuit 601.

Figure 12:
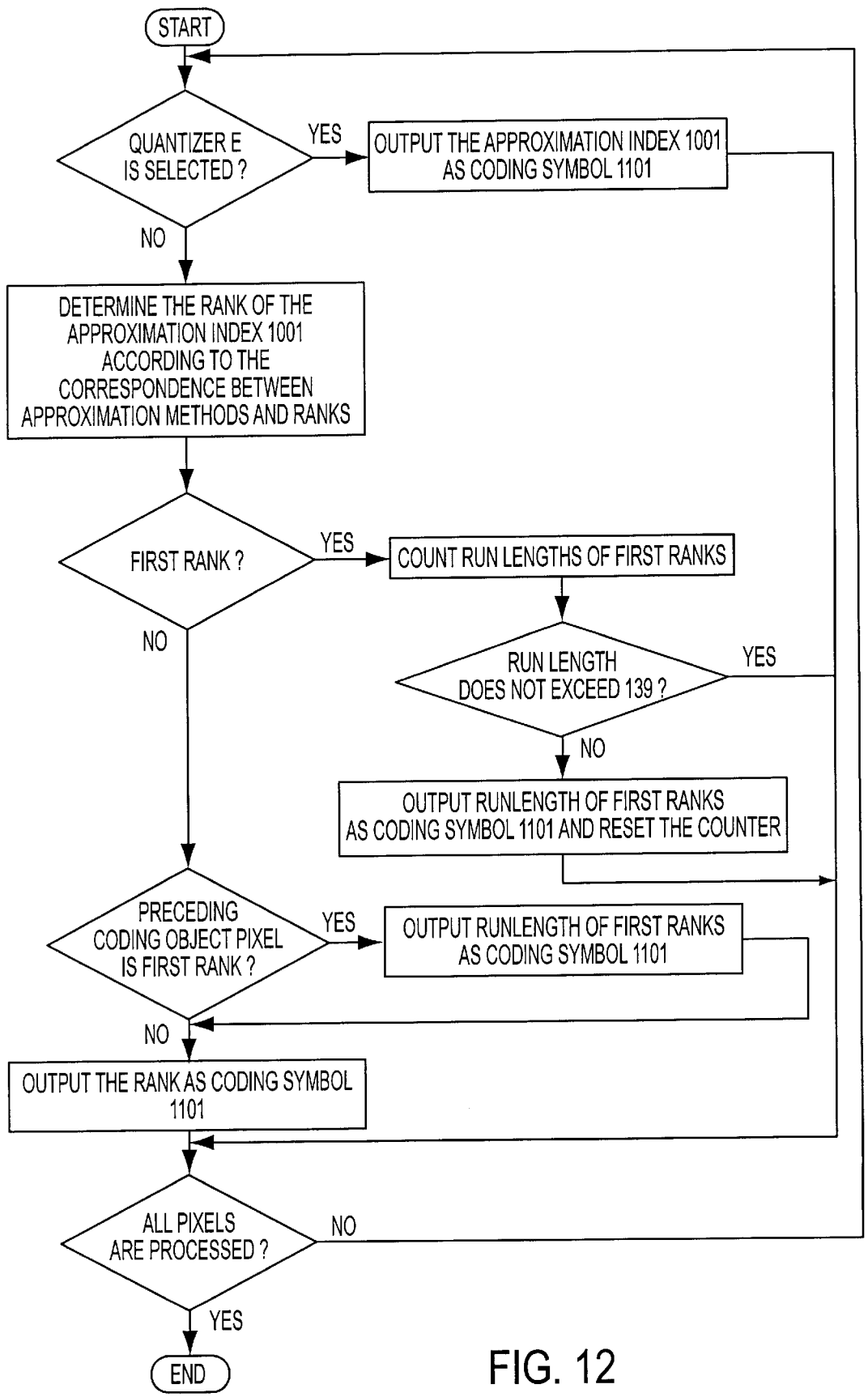
FIG. 12 is a flowchart illustrating a process performed by rank/runlength calculator circuit 401 in FIG. 4.
Figure 13:
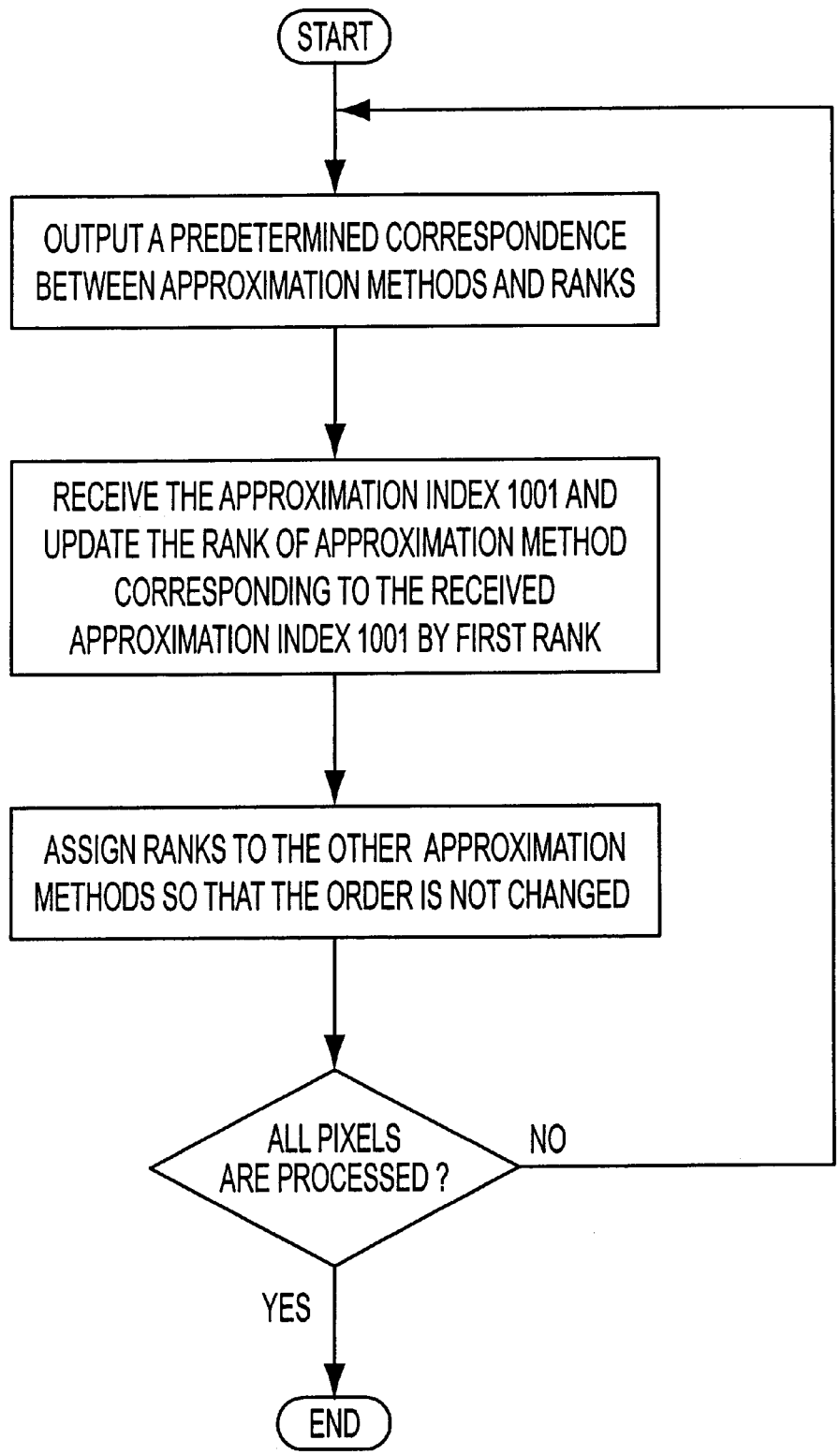
FIG. 13 is a flowchart illustrating a process performed by rank update circuit 402 in FIG. 4.
Figure 14:
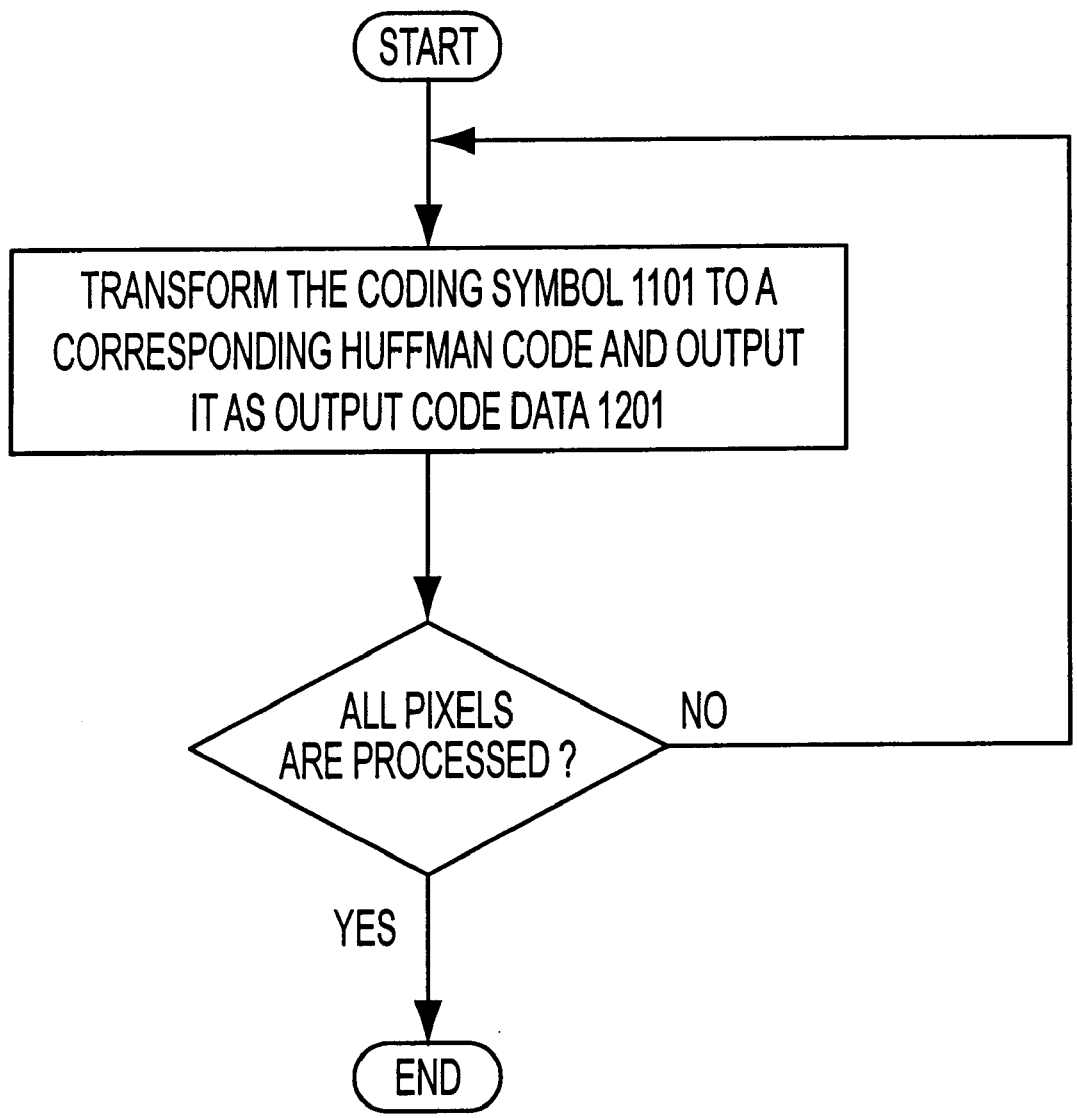
FIG. 14 is a flowchart illustrating a process performed by Huffman coding circuit 501 in FIG. 4.

FIGS. 12, 13 and 14 show processes of the rank/runlength calculator circuit 401, the rank update circuit 402 and the Huffman coding circuit 501, respectively.

Since these figures shows the processes clearly, explanation is omitted. Through these processes, coding as shown in FIG. 15 is performed. The Huffman coding is performed for a coding symbol by using an assignment rule of Huffman codes shown in FIG. 16.

Figure 17:
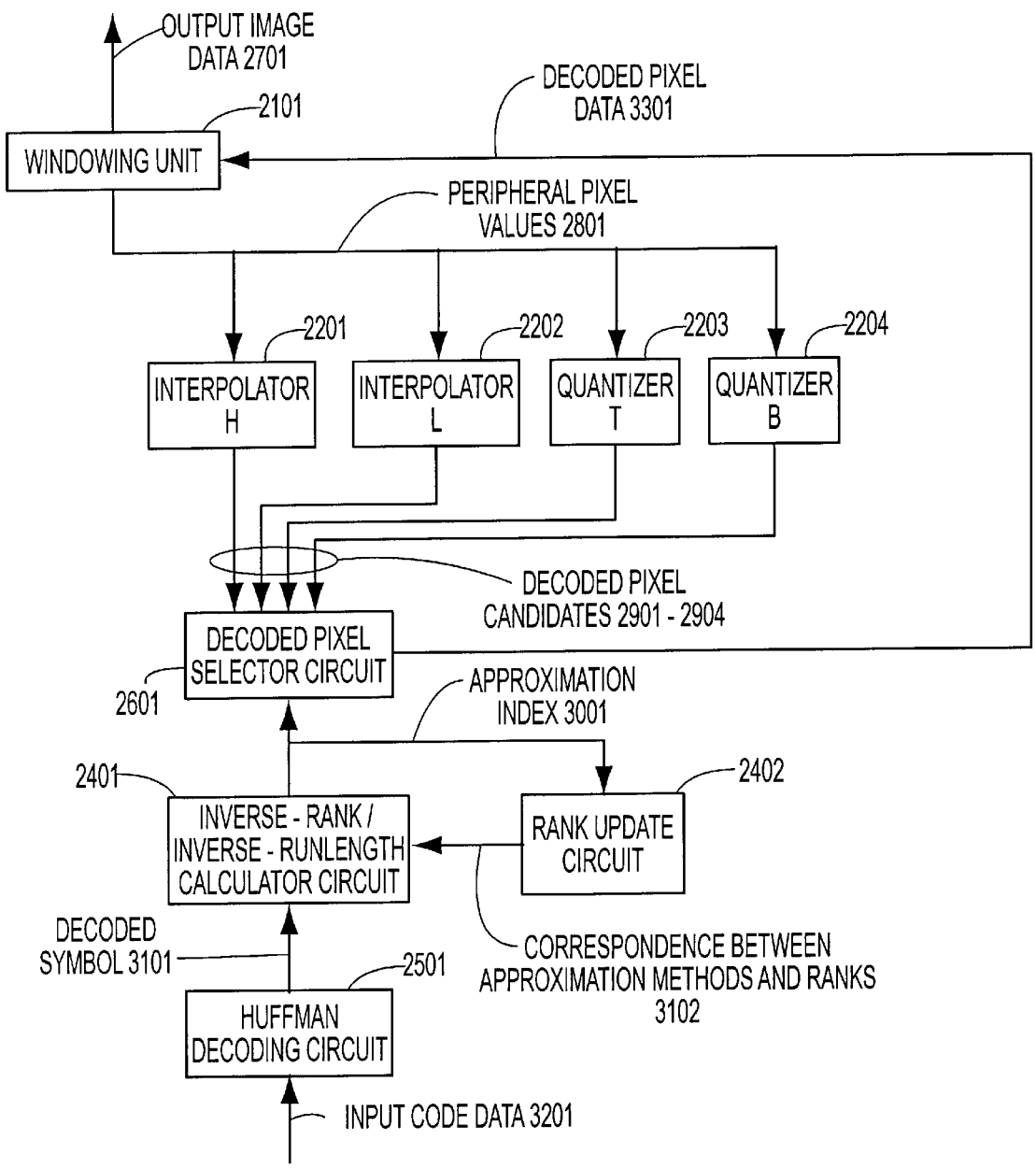
FIG. 17 is a block diagram illustrating an image decoding apparatus in an embodiment of the present invention.
Figure 18:
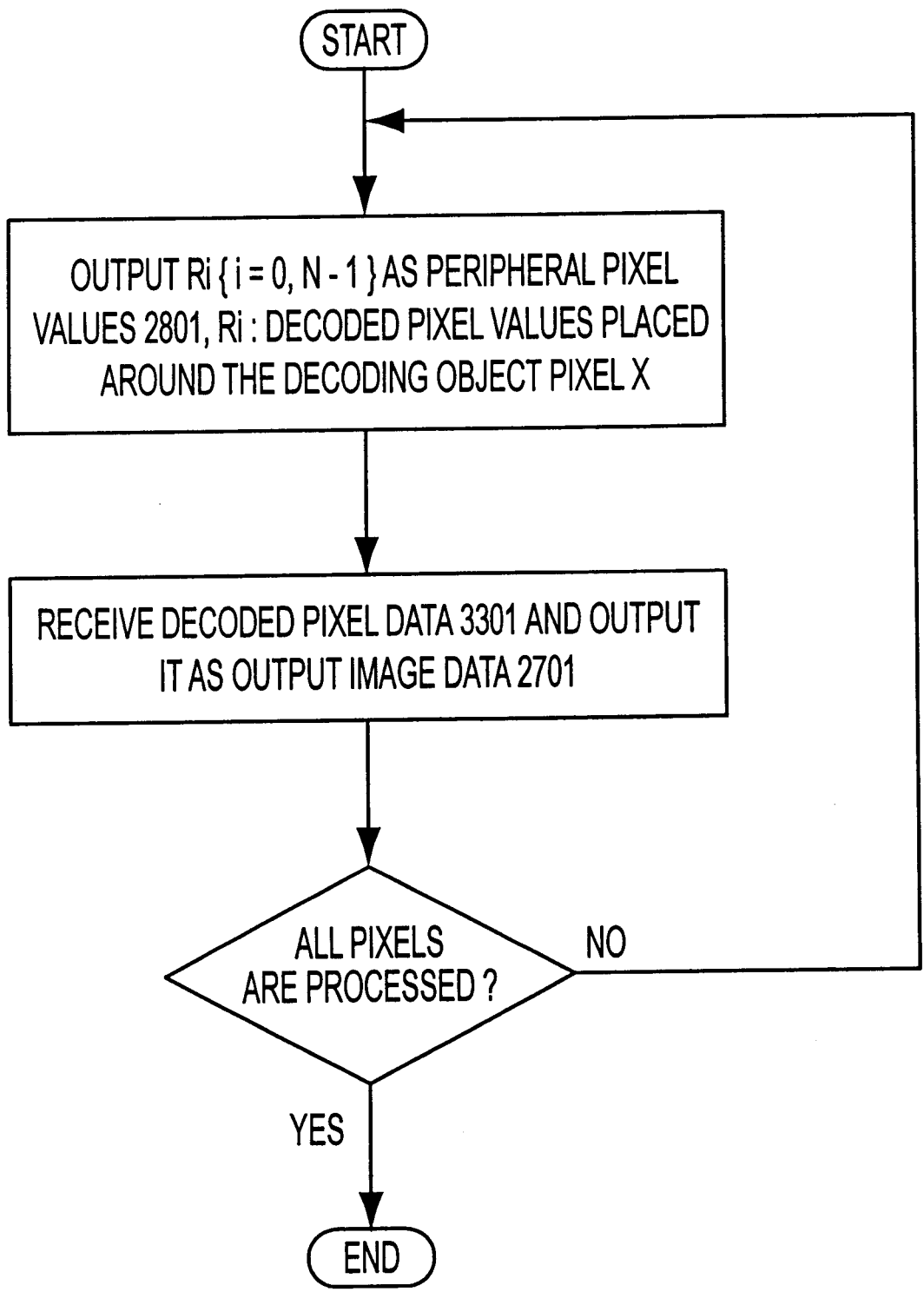
FIG. 18 is a flowchart illustrating a process performed by windowing circuit 2101 shown in FIG. 17.
Figure 19:
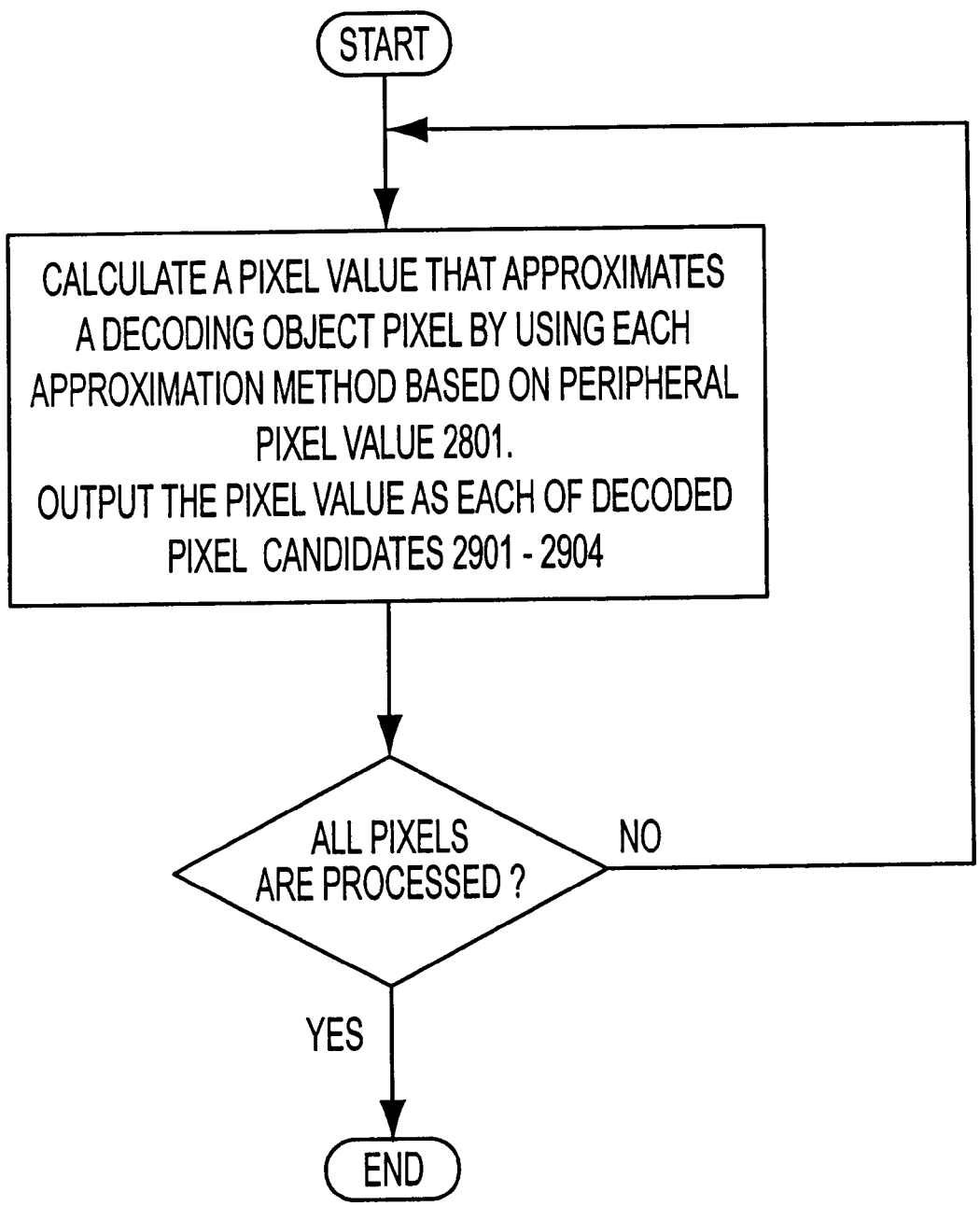
FIG. 19 is a flowchart illustrating a process performed by each of approximation circuits 2201–2204 in FIG. 17.
Figure 20:
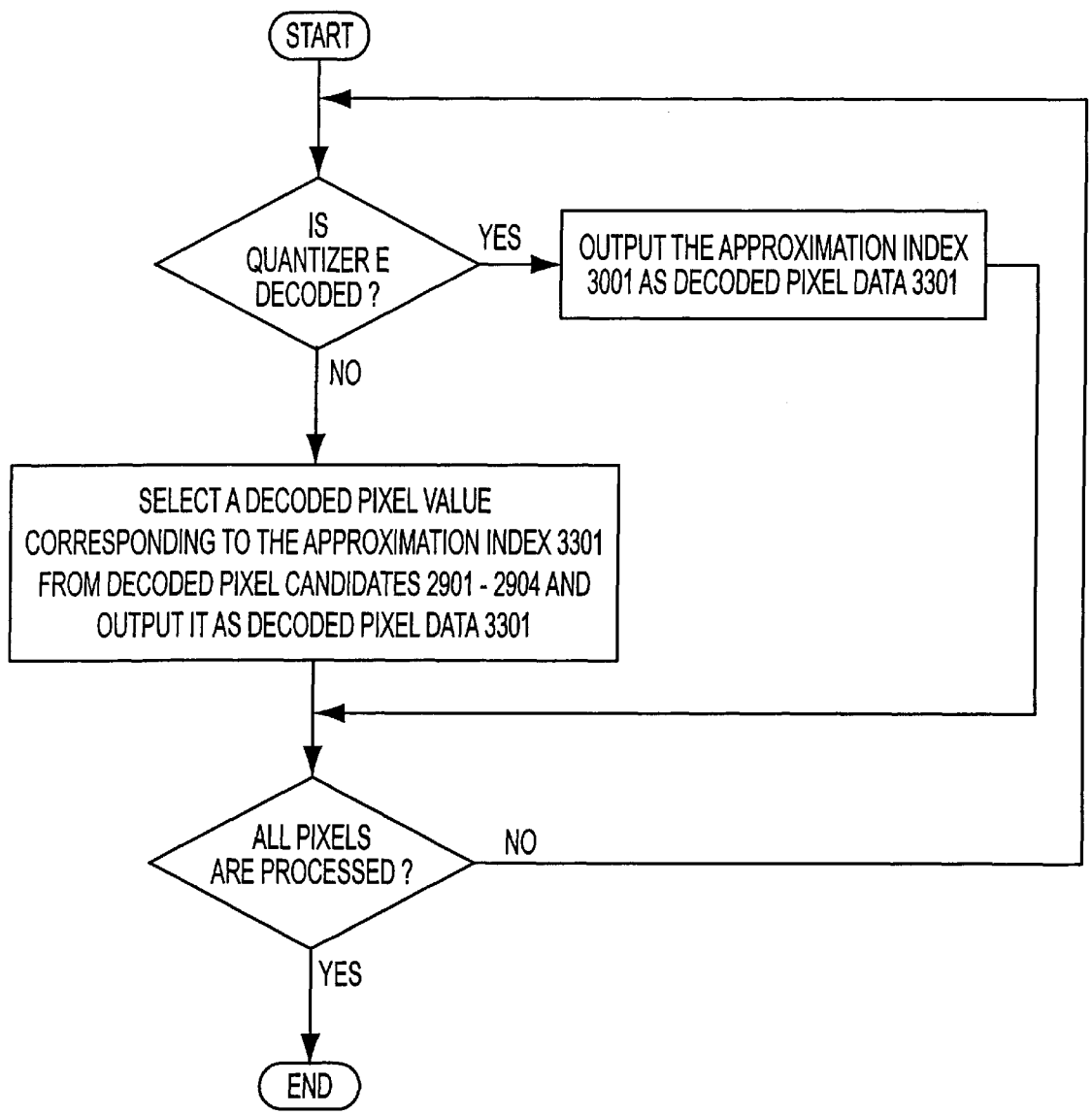
FIG. 20 is a flowchart illustrating a process performed by decoded pixel selector circuit 2601 in FIG. 17.
Figure 21:
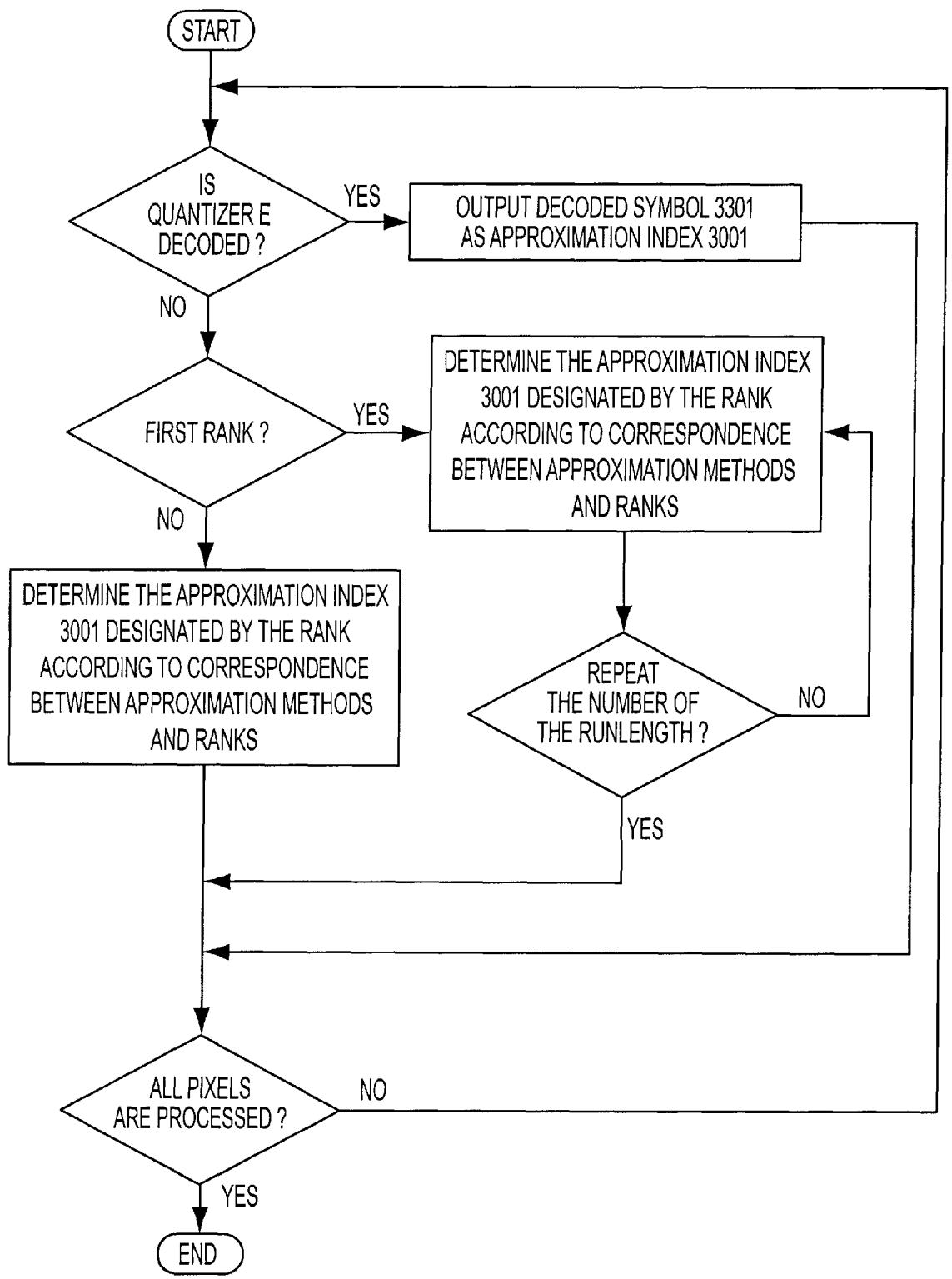
FIG. 21 is a flowchart illustrating a process performed by inverse rank/inverse-runlength calculator circuit 2401 in FIG. 17.
Figure 22:
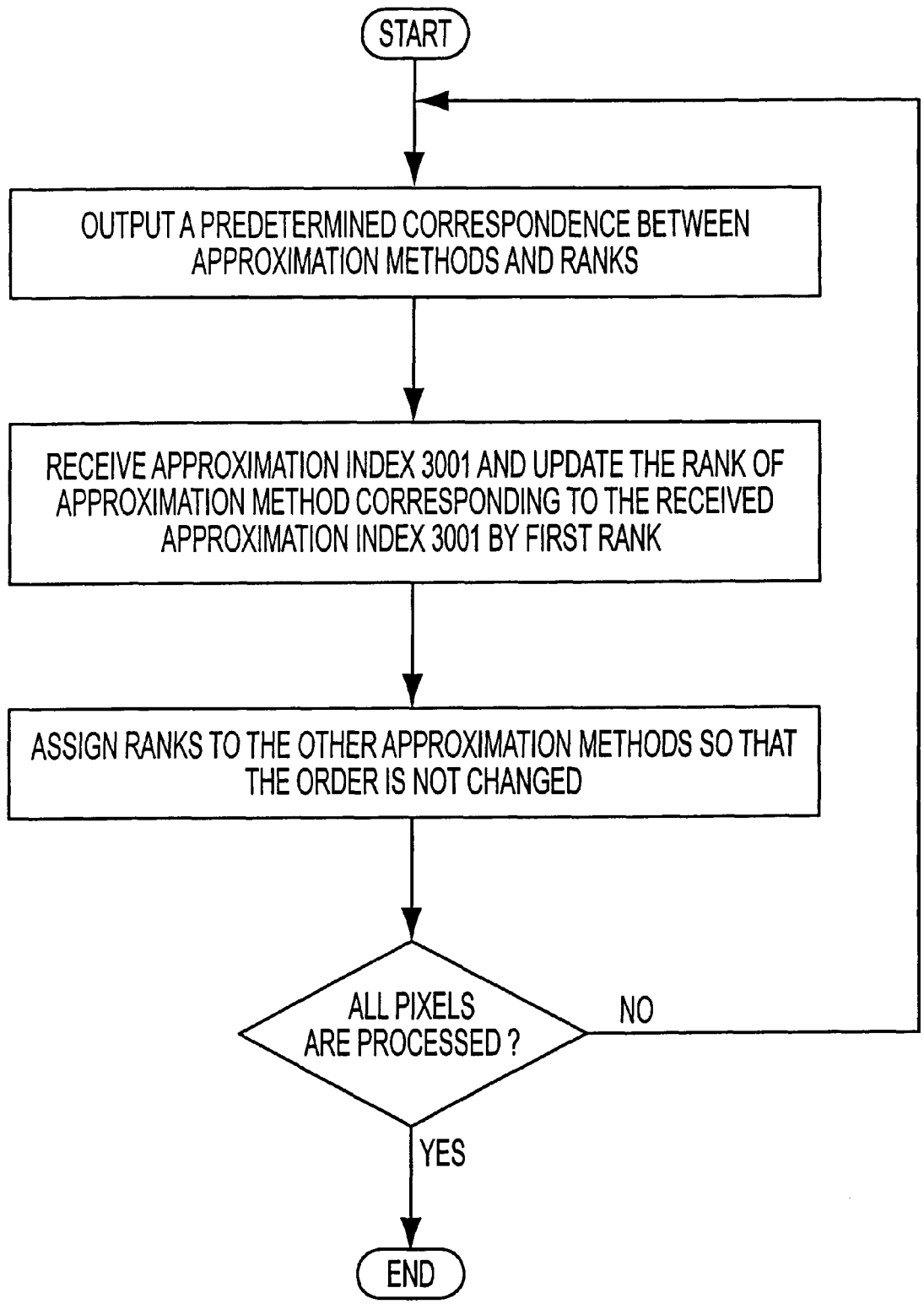
FIG. 22 is a flowchart illustrating a process performed by rank update circuit 2402 in FIG. 17.
Figure 23:
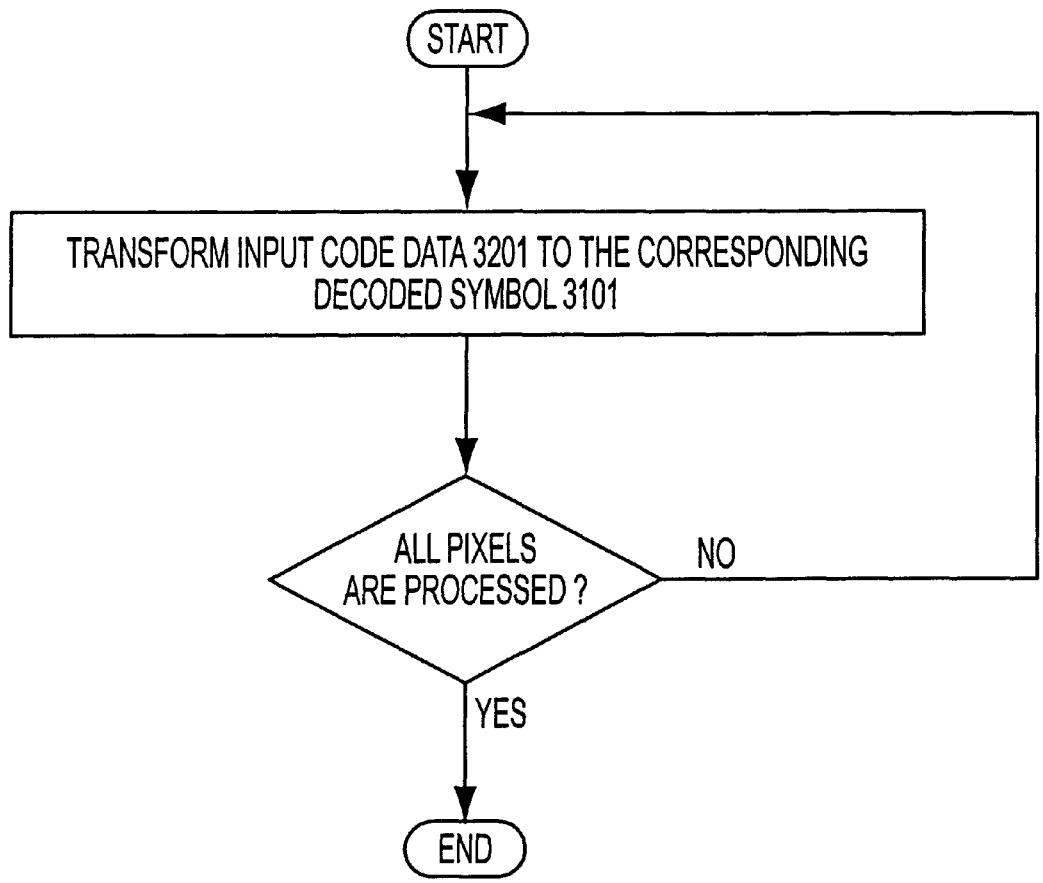
FIG. 23 is a flowchart illustrating a process performed by Huffman decoding circuit 2501 in FIG. 17.
Figure 24:
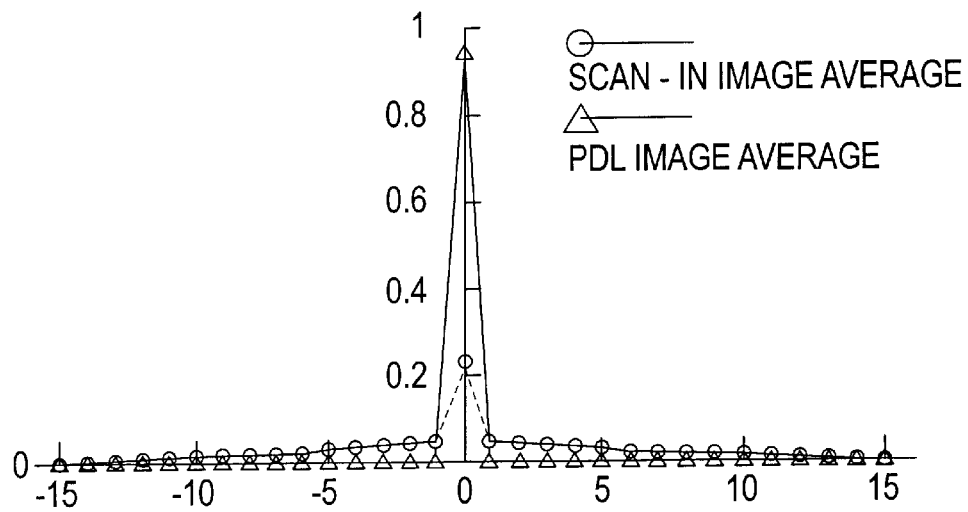
FIG. 24 is a diagram illustrating difference in feature between a PDL image and a scan-in image.
Figure 25:
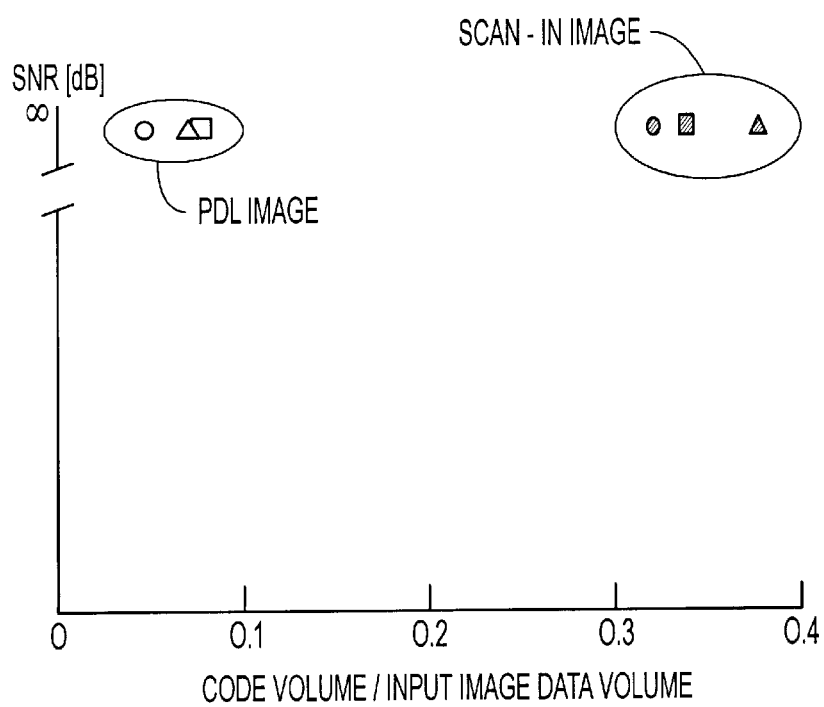
FIG. 25 is a diagram illustrating a coding performance of lossless coding for a PDL image and a scan-in image.

FIG. 17 shows an image decoding apparatus that decodes the output code data coded by the image coding apparatus shown in FIG. 4. In FIG. 17, reference numbers are determined by adding 2000 to the reference numbers of corresponding blocks in FIG. 4. FIGS. 18, 19, 20, 21, 22 and 23 show processes of windowing circuit 2101, approximation circuits 2201 through 2204, decoded pixel selector circuit 2601, inverse-rank/inverse-runlength calculator circuit 2401, rank update circuit 2402 and Huffman decoding circuit 2501.

The process of the image decoding apparatus shown in FIG. 17 is basically the reverse of that of the image coding apparatus shown in FIG. 4. Accordingly, since the processes of these circuits are clear from the description shown in FIG. 18 through FIG. 23, a detailed explanation is omitted.

In the embodiment described above, the minimum error selector circuit 301 uses a predetermined allowable error. However, it is possible to calculate an allowable error appropriate for a coding object pixel based on the peripheral pixel values 801. For example, the allowable error can be determined according to the variance of the pixel values.

The embodiment described above has the following effects.

(1) Lossless coding and near-lossless coding can be performed for both an artificial (computer generated) image such as PDL and a scan-in image in a framework.

(2) Tone or resolution is adaptively approximated (quantized or sub-sampled) according to the local feature of the scan-in image. Therefore, both gradation areas, which require tone reproduction, and fine image structure areas, which require reproduction of resolution, can be coded efficiently.

An approximation method using an interpolator is preferable for use in a gradation area. In other words, since an error of an interpolator is small, first ranks easily appear consecutively. By coding the runlength of the first ranks, it is possible to achieve the compression ratio that can be obtained when an image is sub-sampled at the high sampling rate appropriate for a frequency bandwidth of the gradation area. Accordingly, a gradation area can be compressed efficiently even if raster-scan is used. FIG. 27 shows an example of coding of a gradation image. As shown in FIG. 27, interpolator A can calculate approximate values well in an gradation area, and first ranks appear consecutively. Then, plural coding object pixels can be coded into a runlength.

An approximation method using a quantizer is preferable for use in a fine image structure area, since auto-correlation of an image in the fine image structure area is low and a conventional prediction of a pixel value does not work well. In other words, an approximation error of a quantizer is small and high ranks appear easily. Therefore, pixel value prediction that expects auto-correlation of an image in a fine image structure area is not used. Instead, an appropriate quantizer is designed based on distribution of peripheral pixel values, and a rank of the quantizer is coded. Thus, rough quantization appropriate for the effective tone reproduction of a fine image structure area achieves high compression ratio. Thus, a fine image structure area can be compressed efficiently, even if a prediction coding is used. FIG. 28 shows an example of coding of a fine image structure area. As shown in FIG. 28, quantizer A or quantizer B calculates an approximate value in a fine image structure area well, and a first rank and second rank easily appear. Thus, the fine image structure is compressed efficiently. A conventional pixel value prediction lowers a compression ratio, since it is difficult to predict a pixel value.

Figure 26:
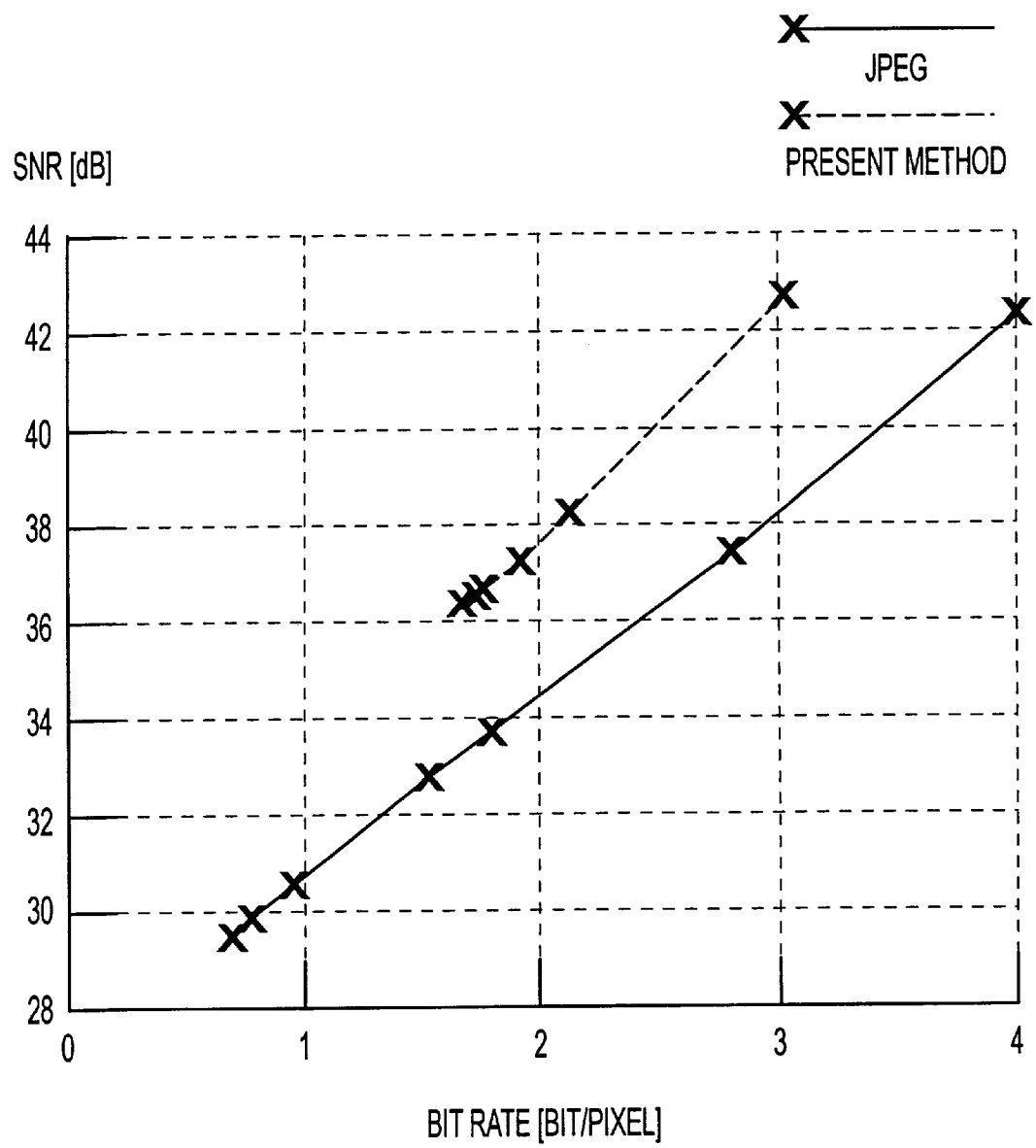
FIG. 26 is diagram illustrating a coding performance of an embodiment of the present invention.
Figure 29:
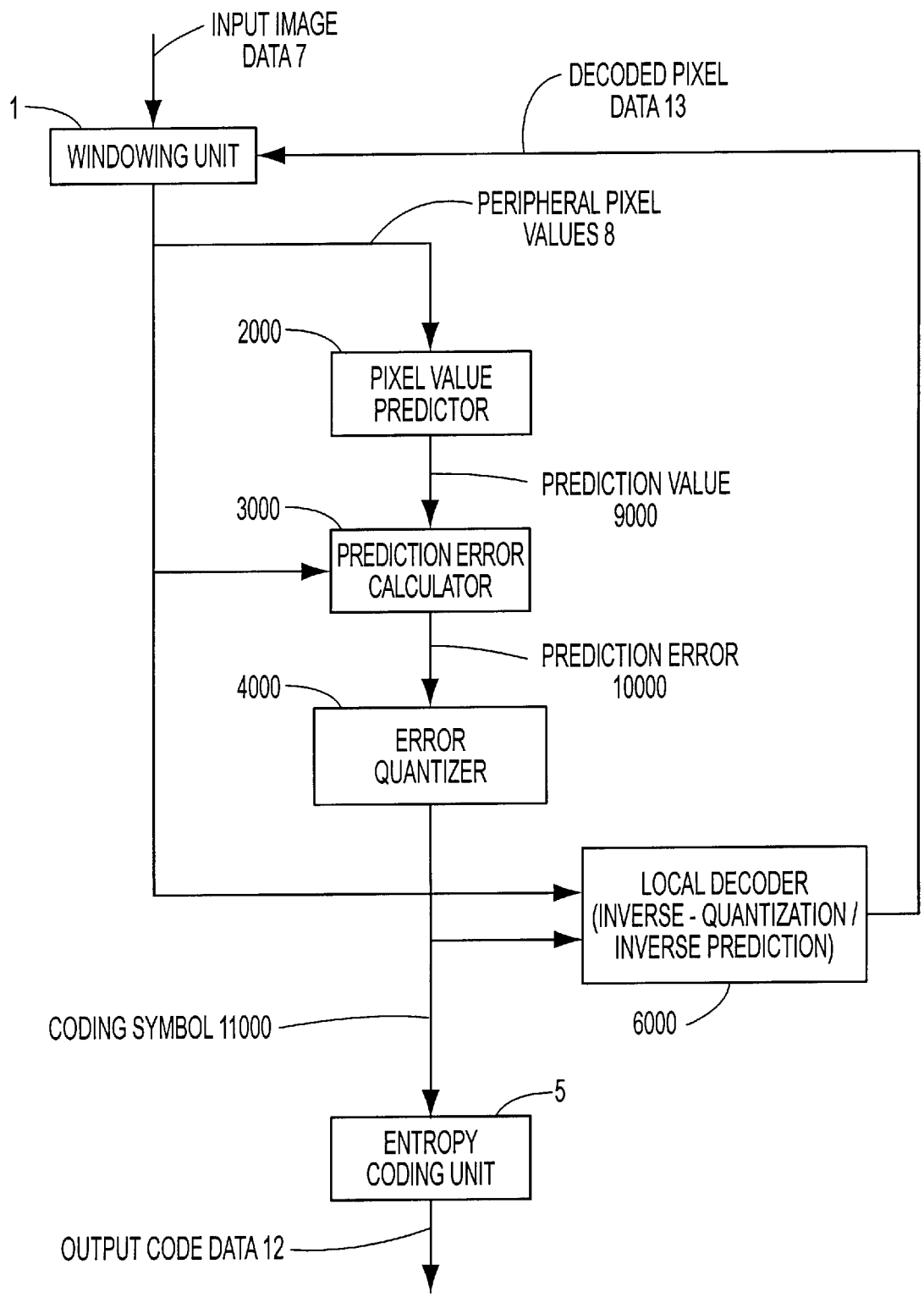
FIG. 29 is a block diagram illustrating an image coding apparatus of conventional LOCO-I.

FIG. 26 shows a comparison of coding rates between a conventional art, JPEG process, and the present invention. The image data to be coded is magenta in SCID image No. 7 of JIS. This image data includes both a gradation area where tone reproduction is important, such as a cheek of a woman, and a fine image structure area where reproduction of resolution is important, such as a sand wall in a background. To observe coding rate of a scan-in image, sub-sampling, which is quantization of an orthogonal transform coefficient, is compared with JPEG, which executes the similar process to quantization of a pixel value. A prediction coding of raster-scan, such as LOCO-I, is not used here. As shown in this figure, the embodiment of the present invention achieves higher performance than JPEG does, in spite of the prediction coding of a raster-scan.

(3) It is possible to control the image qualities in an area where tone reproduction is essential and in an area where tone reproduction is not essential by setting adaptively an allowable error based on the pixel values around a coding object pixel.

The embodiment described above uses an approximation method that focuses on a tone level and an approximation method that focuses on a resolution so that information in both a gradation area and a fine image structure area can be compressed or coded efficiently. It is possible to use approximation methods suited for periodicity or other features of information included in an image so that useful information included in an image is compressed efficiently.

As described above, embodiments of this invention achieve image coding by encoding a rank of an approximation method that calculates an approximate value of a coding object pixel. Thus, an approximation method dependent on important factors in an image can be used. Accordingly, data volume can be compressed without deterioration of image quality.

What is claimed is:

1. An image coding apparatus comprising:
   an output unit that outputs a value of a first pixel and a value of a second pixel located near the first pixel, the value of the second pixel having been approximated;
   an approximation unit that calculates approximate values of the first pixel using pixel approximation methods on the basis of the value of the second pixel;
   a selector that calculates an error between the value of the first pixel and each of the approximate values, and selects one of the approximation methods based on the approximation method producing the minimum error;
   a ranking unit that assigns a rank to the selected approximation method;
   wherein the more or less recently selected an approximation method, the higher or lower the rank respectively, or the more or less frequently selected the approximation method, the higher or lower the rank respectively; and
   an encoder that encodes the rank so as to obtain a code for the first pixel.

2. The image coding apparatus as set forth in claim 1, wherein
   the rank of the approximation method producing the minimum error is determined in accordance with a predetermined ranking of the approximation methods; and
   the ranking of the approximation methods is updated after a first value is encoded.

3. The image coding apparatus as set forth in claim 2, wherein
   the ranking of the approximation methods is updated in accordance with a frequency in appearance of the approximation method with the minimum error.

4. The image coding apparatus as set forth in claim 1, wherein
   the ranking unit counts a runlength of first ranks, and
   the encoder encodes the runlength of the first ranks so as to obtain a code for consecutive first pixels.

5. The image coding apparatus as set forth in claim 1, wherein
   the approximation methods include an interpolation method and a quantization method.

6. The image coding apparatus as set forth in claim 5, wherein the interpolation method interpolates the approximate value of the first pixel in accordance with the second value.

7. The image coding apparatus as set forth in claim 5, wherein the interpolation method extrapolates the approximate value of the first pixel in accordance with the second value.

8. The image coding apparatus as set forth in claim 1, wherein when the minimum error is not smaller than a predetermined allowable error, the selector outputs the approximate value corresponding to a predetermined one of the approximation methods; and the encoder encodes the approximate value so as to obtain a code for the first pixel.

9. The image coding apparatus as set forth in claim 8, wherein the allowable error is adaptively determined by using the second value.

10. The image coding apparatus as set forth in claim 9, wherein the allowable error is determined in accordance with a variance of the second values.

11. The image coding apparatus as set forth in claim 1, wherein the minimum error ranges between zero and a predetermined non-zero allowable error.

12. An image coding method, comprising the steps of:

receiving a value of a first pixel and a value of a second pixel located near the first pixel, the value of the second pixel having been approximated;

calculating approximate values of the first pixel and each of the approximate values;

selecting a minimum approximation method, which is one of the approximation methods that produces a minimum error;

assigning a rank to the minimum approximation method;

wherein the more or less recently selected an approximation method, the higher or lower the rank respectively, or the more or less frequently selected the approximation method, the higher or lower the rank respectively; and encoding that rank so as to obtain a code for the first pixel.

13. The image coding method as set forth in claim 12, further comprising the steps of:

counting runlength of first ranks; and encoding the runlength so as to obtain a code for the consecutive first pixels.

14. The image coding method as set forth in claim 12, further comprising the steps of:

comparing the minimum error with a predetermined allowable error; and when the minimum error is not smaller than the predetermined allowable error, encoding the error corresponding to a predetermined one of the approximation methods so as to obtain a code for the first poxel.

15. The image coding method as set forth in claim 12, wherein the minimum error ranges between zero and a predetermined non-zero allowable error.

* * * * *